United States Patent
Park et al.

(10) Patent No.: US 11,881,915 B2
(45) Date of Patent: Jan. 23, 2024

(54) METHOD FOR TRANSMITTING AND RECEIVING SIGNAL IN WIRELESS COMMUNICATION SYSTEM, AND APPARATUS THEREFOR

(71) Applicant: LG ELECTRONICS INC., Seoul (KR)

(72) Inventors: Haewook Park, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 17/601,517

(22) PCT Filed: Mar. 30, 2020

(86) PCT No.: PCT/KR2020/004312
§ 371 (c)(1),
(2) Date: Oct. 5, 2021

(87) PCT Pub. No.: WO2020/204523
PCT Pub. Date: Oct. 8, 2020

(65) Prior Publication Data
US 2022/0190892 A1 Jun. 16, 2022

Related U.S. Application Data

(60) Provisional application No. 62/830,361, filed on Apr. 5, 2019.

(51) Int. Cl.
*H04L 1/02* (2006.01)
*H04B 7/0456* (2017.01)
*H04W 28/02* (2009.01)

(52) U.S. Cl.
CPC ...... *H04B 7/0456* (2013.01); *H04W 28/0236* (2013.01)

(58) Field of Classification Search
CPC ............ H04B 7/0456; H04W 28/0236; H04W 72/04; H04W 72/12; H04L 27/26
(Continued)

(56) References Cited

U.S. PATENT DOCUMENTS

| 8,000,401 | B2 * | 8/2011 | Lee ...................... H04B 7/0671 375/260 |
| 8,509,710 | B2 * | 8/2013 | Kim .................... H04L 25/0242 375/299 |

(Continued)

FOREIGN PATENT DOCUMENTS

| CN | 101359944 | * | 2/2009 |
| CN | 101461205 | * | 6/2009 |

(Continued)

OTHER PUBLICATIONS

Huawei, HiSilicon, "Sidelink physical layer procedures for NR V2X," R1-1901537, presented at 3G99 TSG RAN WG1 Meeting #96, Athens, Greece, Feb. 25-Mar. 1, 2019, 16 pages.

(Continued)

*Primary Examiner* — Helene E Tayong
(74) *Attorney, Agent, or Firm* — Fish & Richardson P.C.

(57) ABSTRACT

A method for transmitting an uplink signal by a terminal in a wireless communication system.
More specifically, a method performed by the terminal includes receiving, from a base station, first control information related to a delay value which is applied to precoding for small-delay cyclic delay diversity (CDD); layer mapping complex-valued modulation symbol to at least one transmission layer; precoding, based on a precoding matrix and a diagonal matrix, for transmitting complex-valued modulation symbol on each transmission layer on an antenna port; and transmitting, to the base station, the uplink signal, wherein the diagonal matrix is determined based on the delay value, and wherein the delay value is determined (Continued)

based on the first control information and second control information which is determined based a size of a configured band.

15 Claims, 18 Drawing Sheets

(58) Field of Classification Search
 USPC .......................................................... 375/267
 See application file for complete search history.

(56) References Cited

U.S. PATENT DOCUMENTS

| | | | | |
|---|---|---|---|---|
| 2007/0097856 | A1* | 5/2007 | Wang | H04B 7/0626 |
| | | | | 370/210 |
| 2009/0147865 | A1* | 6/2009 | Zhang | H04L 1/0029 |
| | | | | 375/259 |
| 2010/0002790 | A1* | 1/2010 | Onggosanusi | H04L 5/0023 |
| | | | | 375/260 |
| 2012/0263246 | A1* | 10/2012 | Gazit | H04L 5/0044 |
| | | | | 375/260 |

FOREIGN PATENT DOCUMENTS

| | | | |
|---|---|---|---|
| CN | 101663840 | * | 3/2010 |
| CN | 101689898 | * | 3/2010 |
| KR | 10-2009-0107087 | | 10/2009 |
| WO | WO 2008098092 | * | 8/2008 |
| WO | WO2010/134789 | | 11/2010 |
| WO | WO2016/072819 | | 5/2016 |

OTHER PUBLICATIONS

Huawei, HiSilicon, "Link level evaluations on sidelink for NR V2K," R1-1903949, presented at 3GPP TSG RAN WG1 Meeting #96bis, Xi'an, China, Apr. 8-12, 2019, 6 pages.
PCT/International Search Report in International Application No. PCT/KR2020/004312, dated Jul. 16, 2020, 7 pages.

* cited by examiner

[FIG. 1]
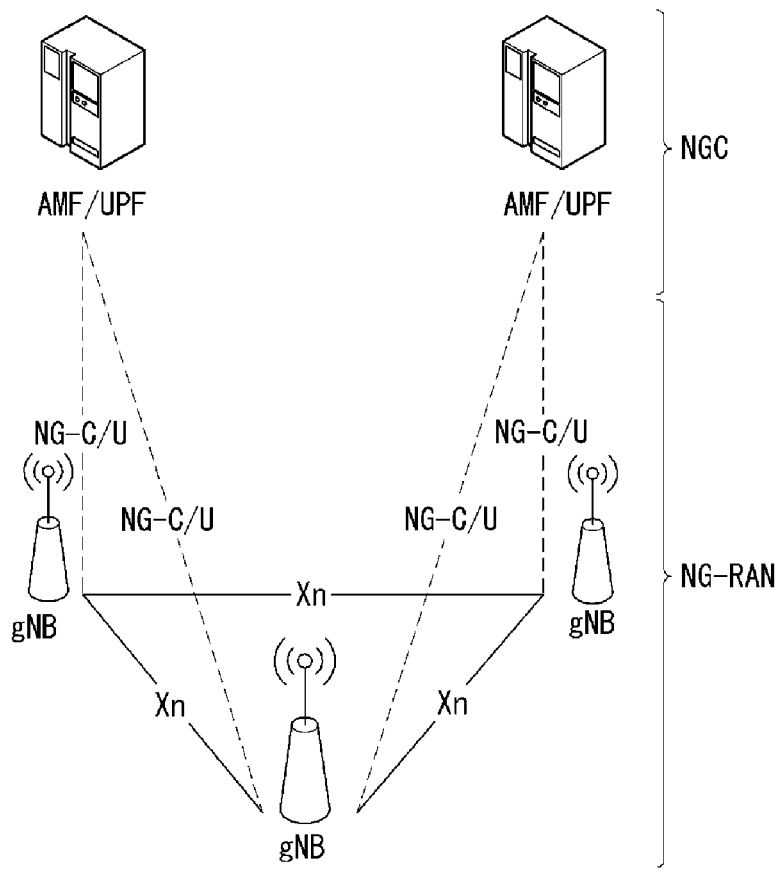
[FIG. 2]
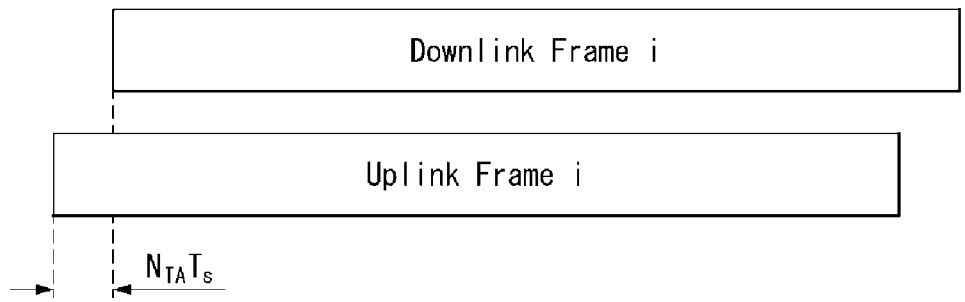

[FIG. 3]
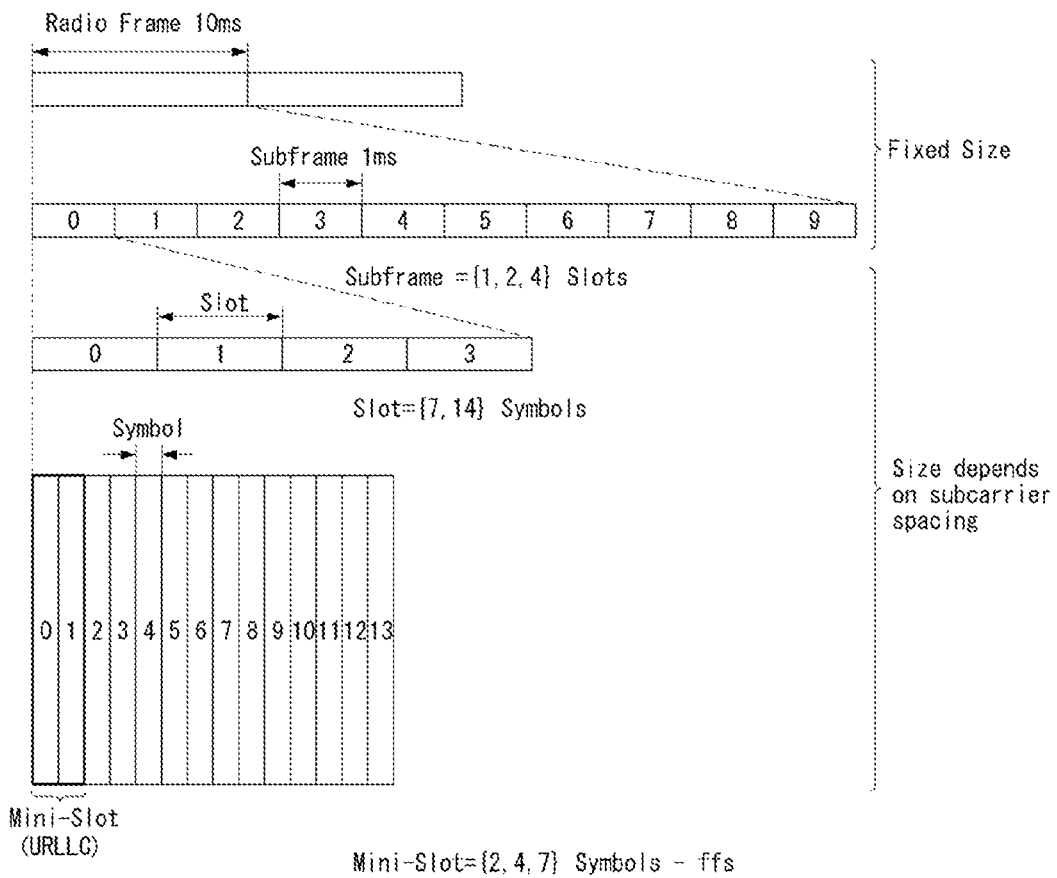

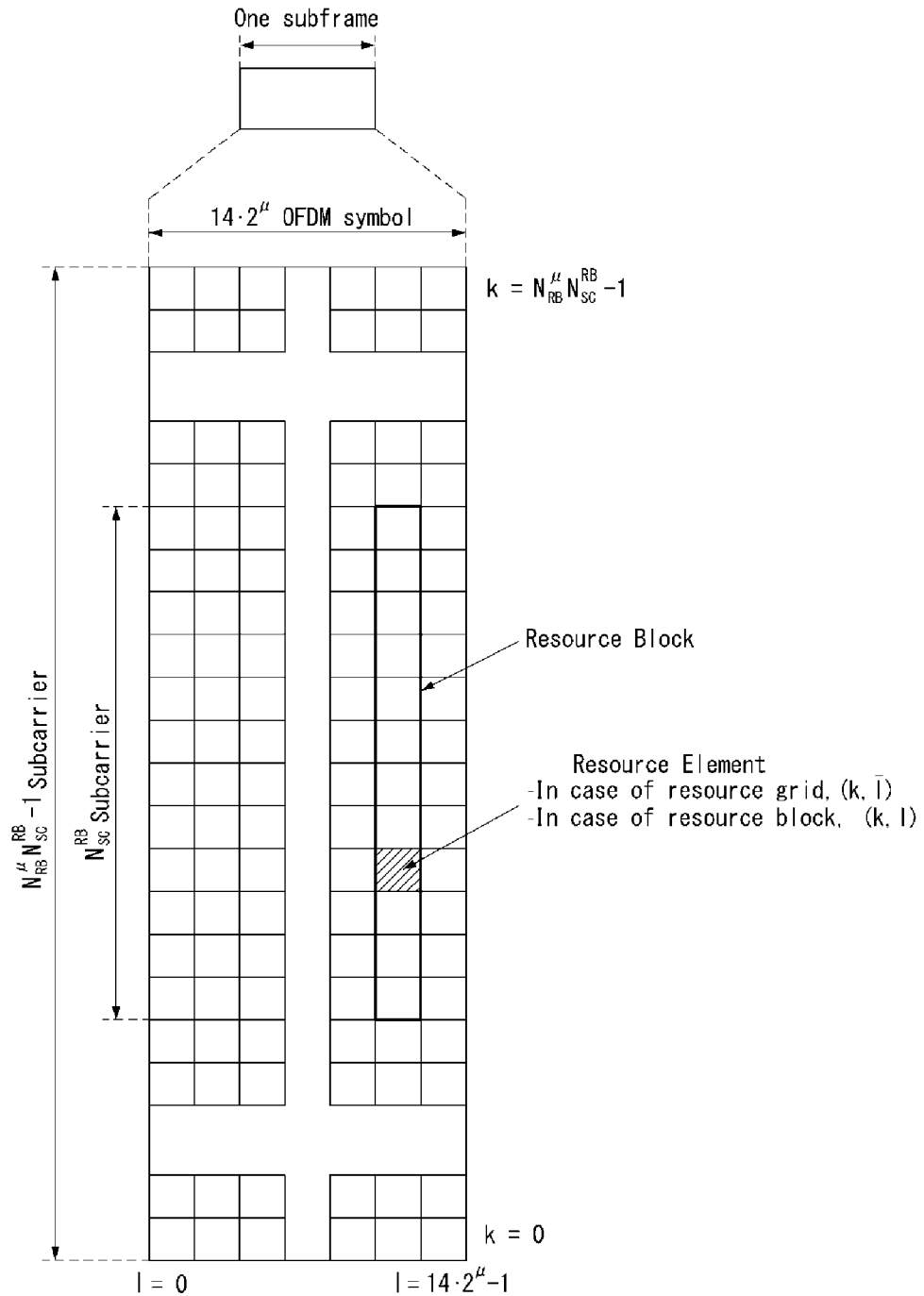
[FIG. 4]

[FIG. 5]
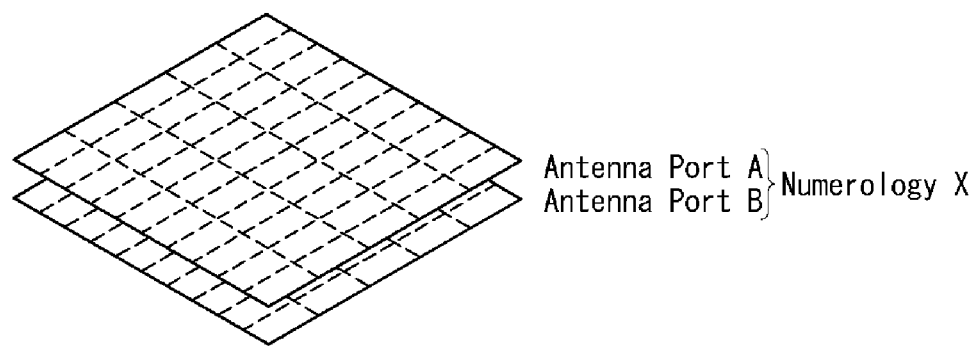
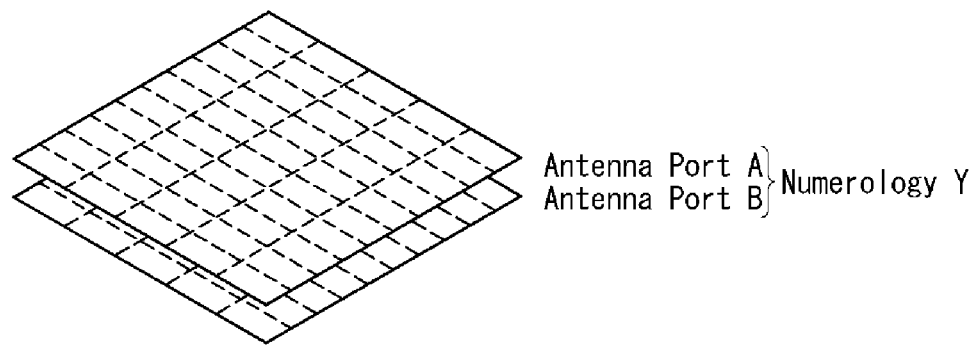

[FIG. 6]
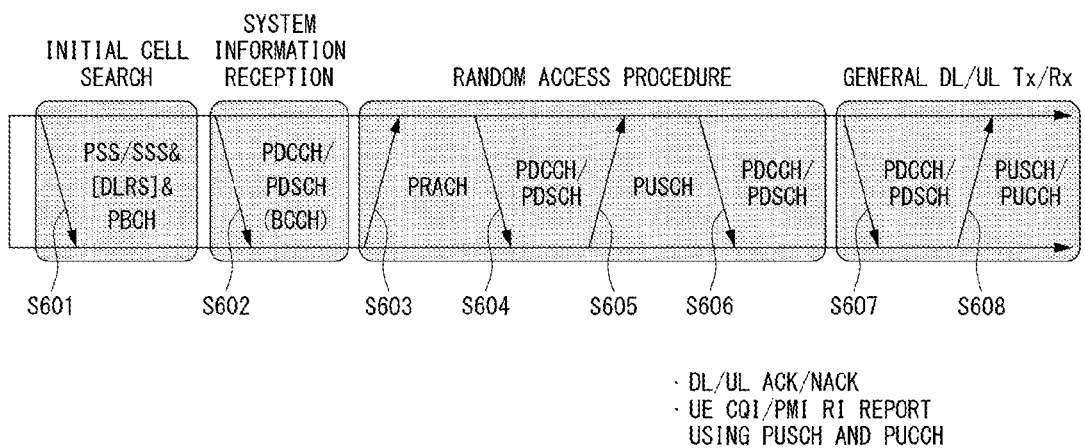
[FIG. 7]
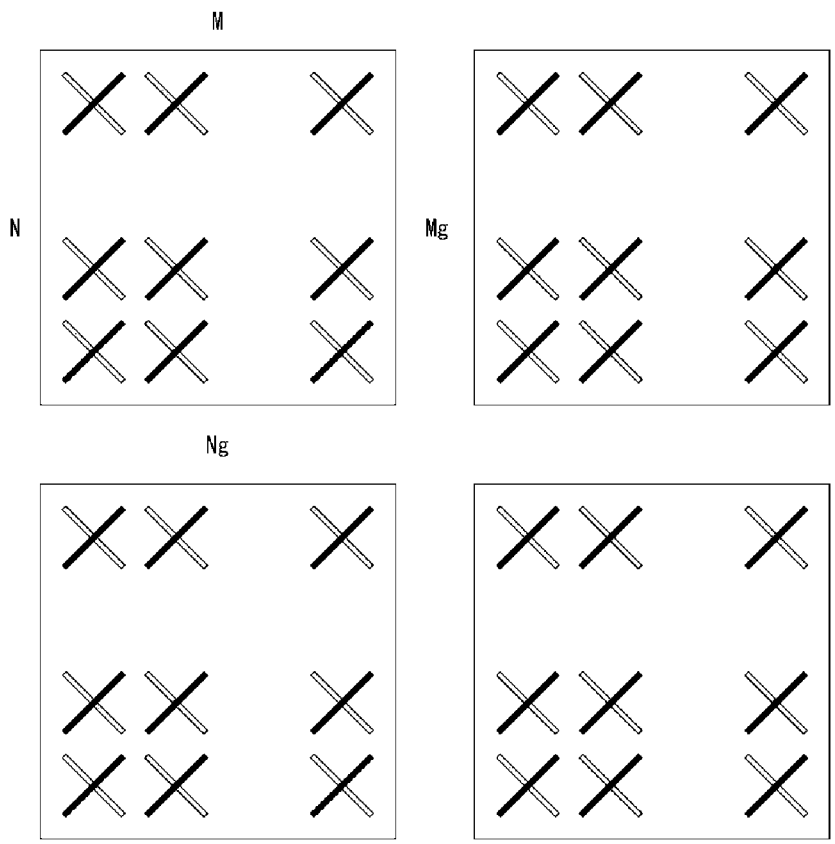

[FIG. 8]
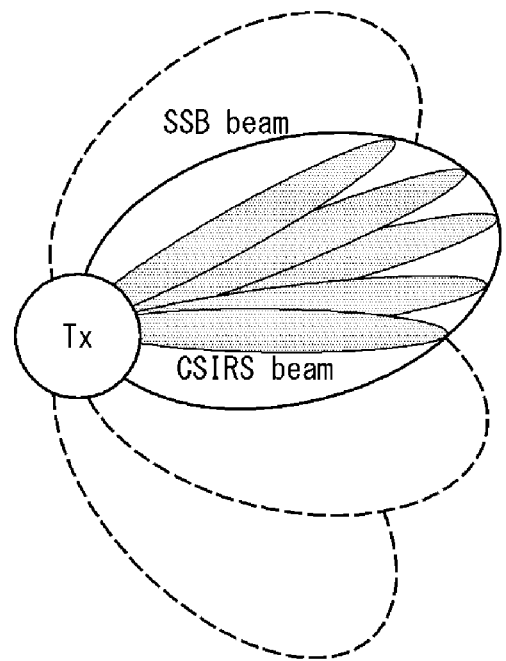
[FIG. 9]
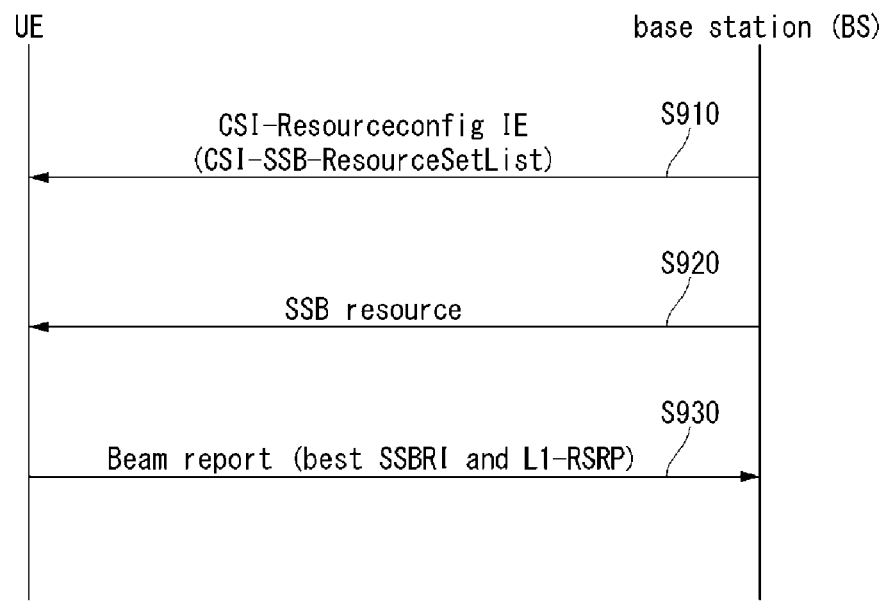

[FIG. 10]
(a)
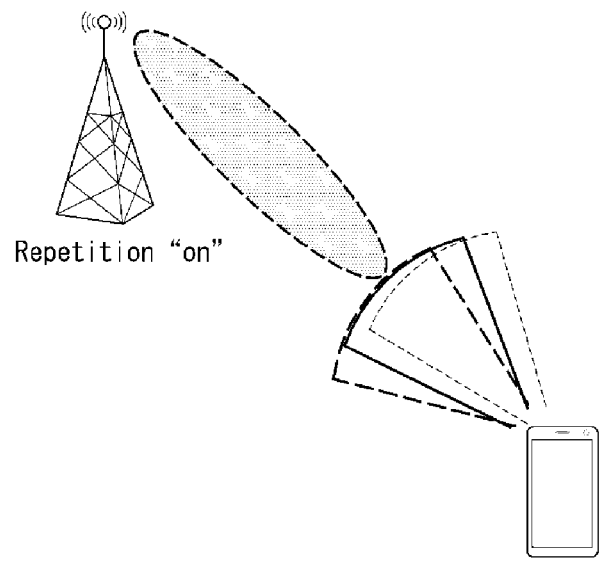
(b)
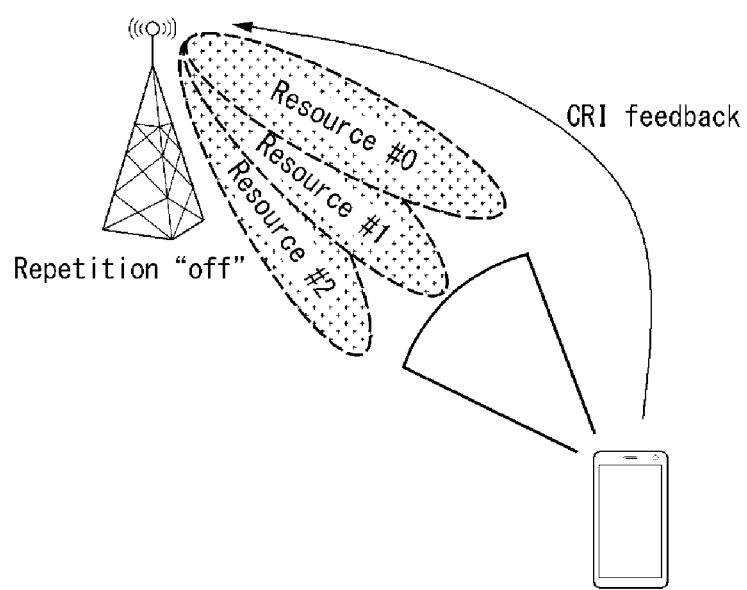

[FIG. 11]
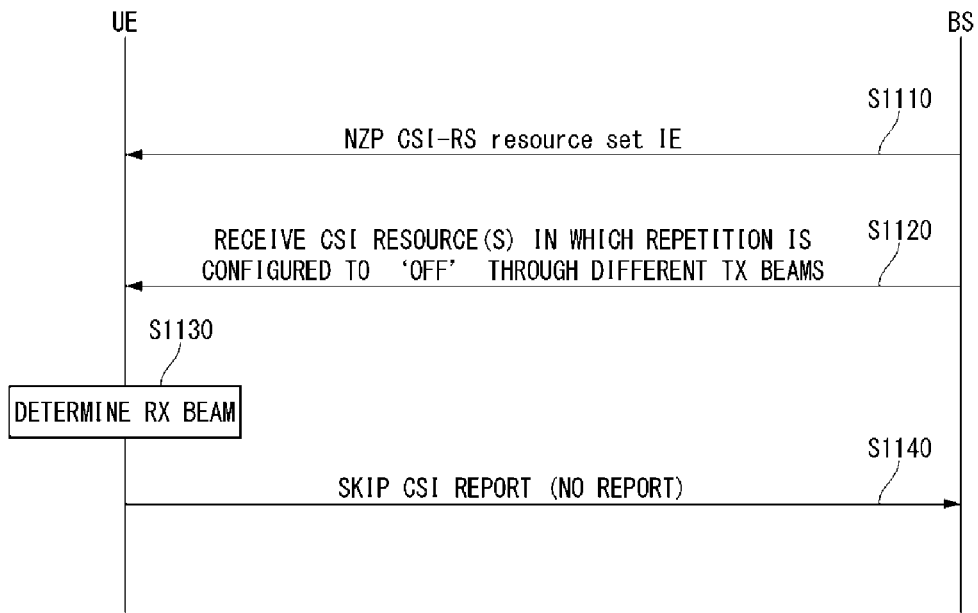
[FIG. 12]
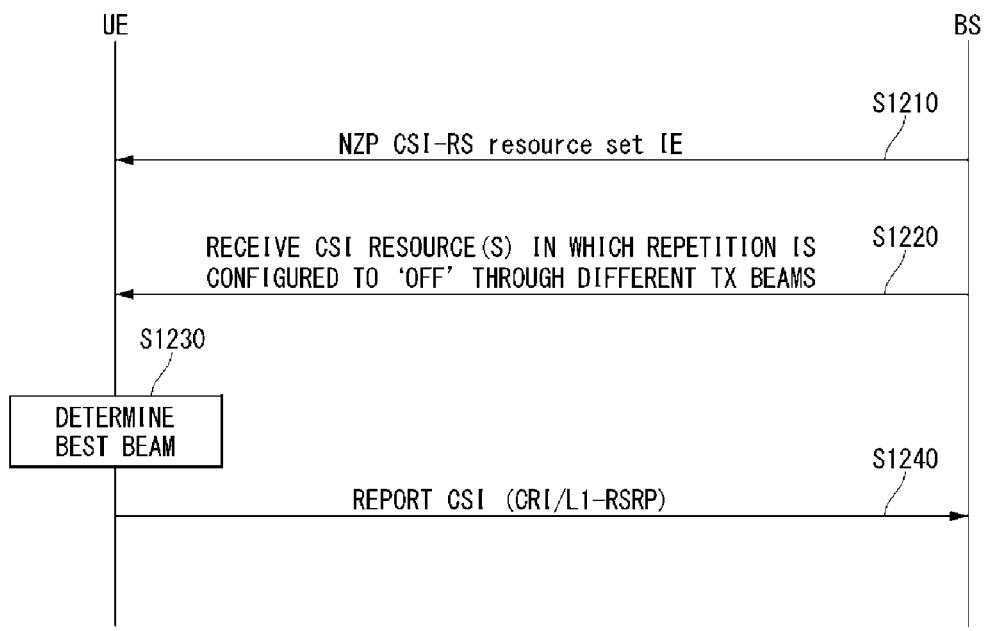

[FIG. 13]
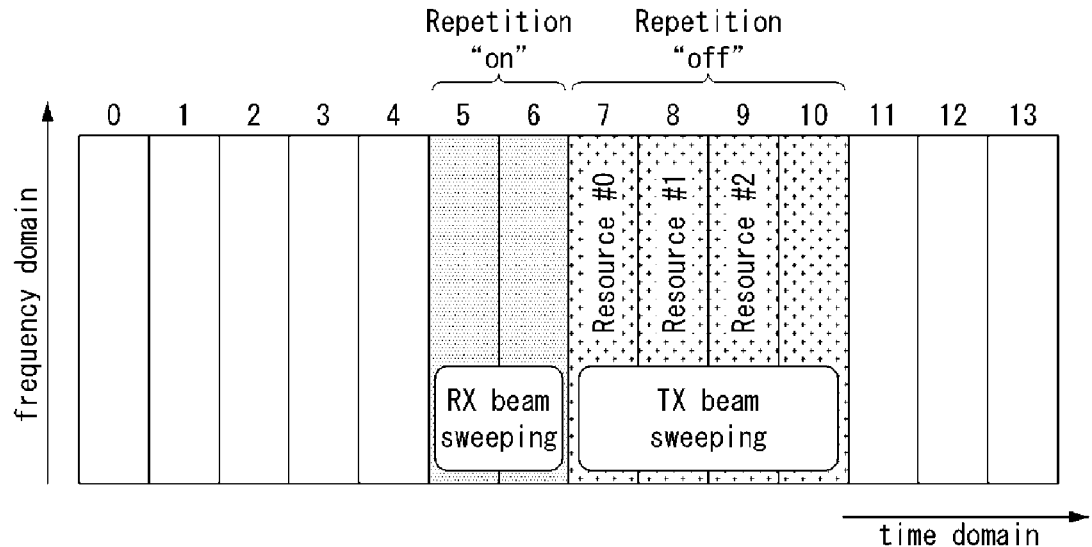
[FIG. 14]
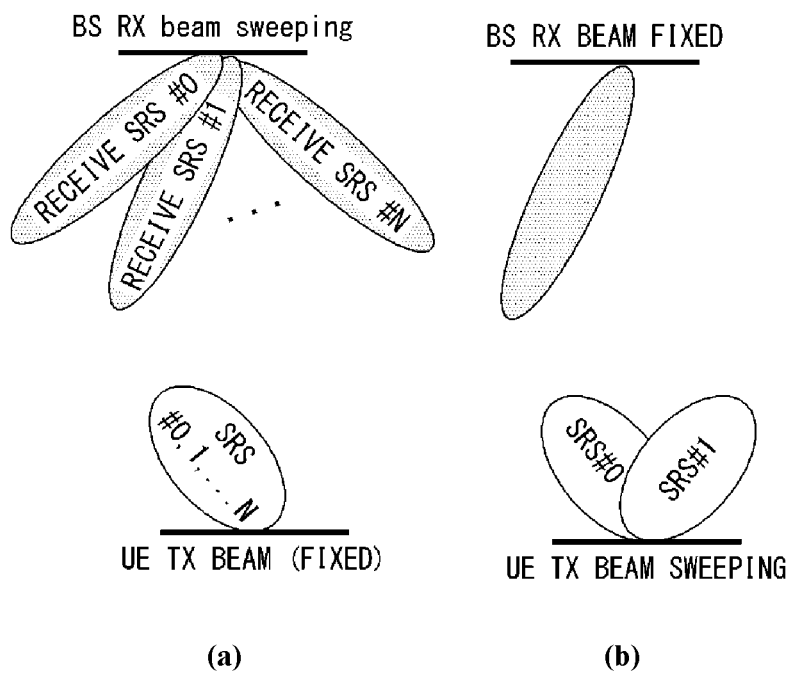
(a)          (b)

[FIG. 15]
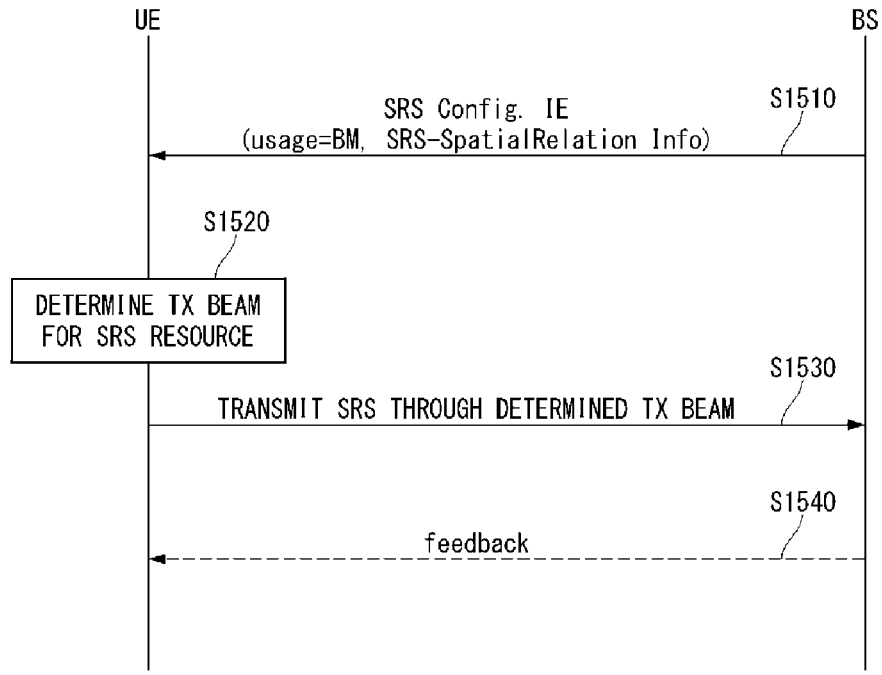
[FIG. 16]
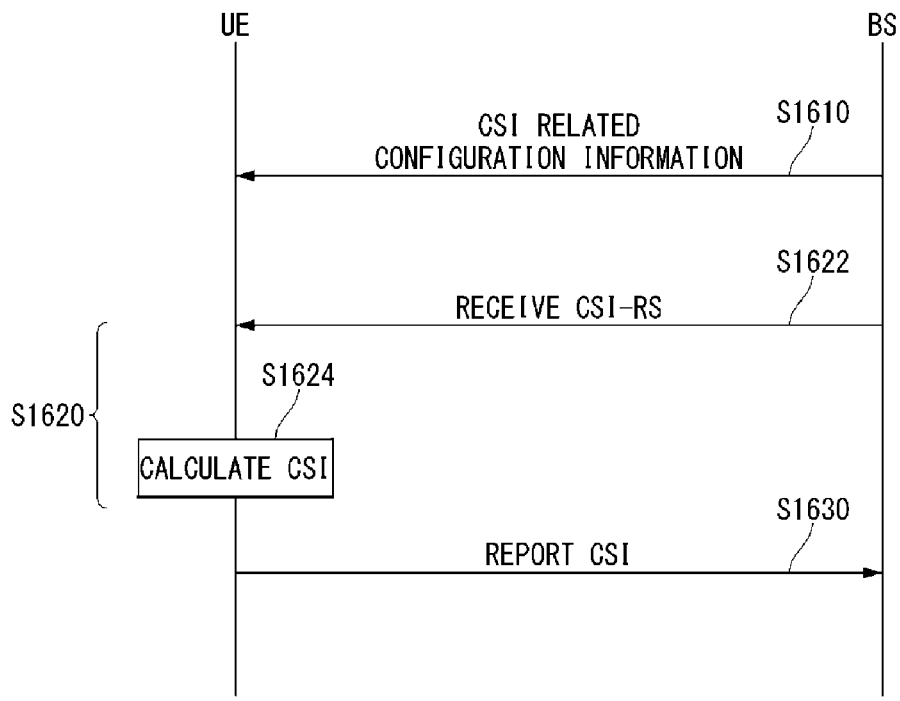

[FIG. 17]
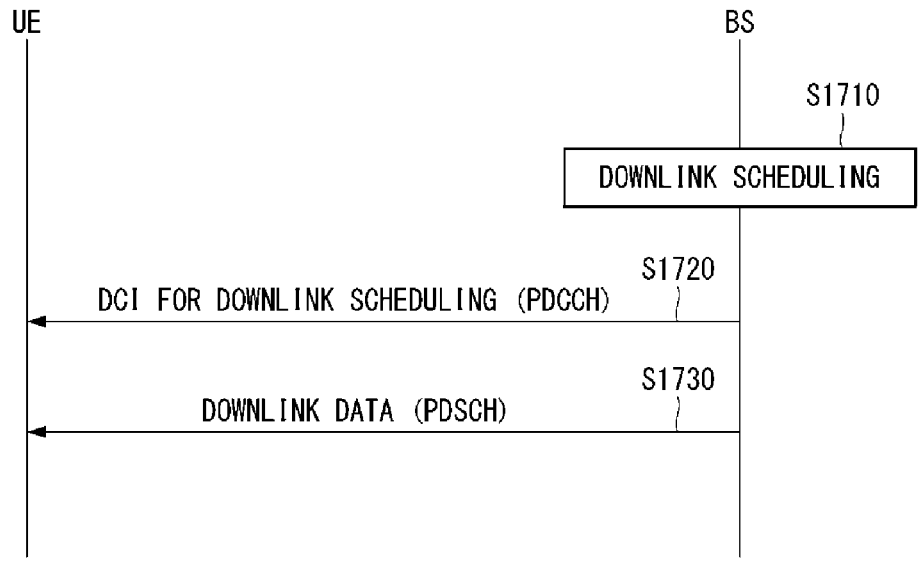
[FIG. 18]
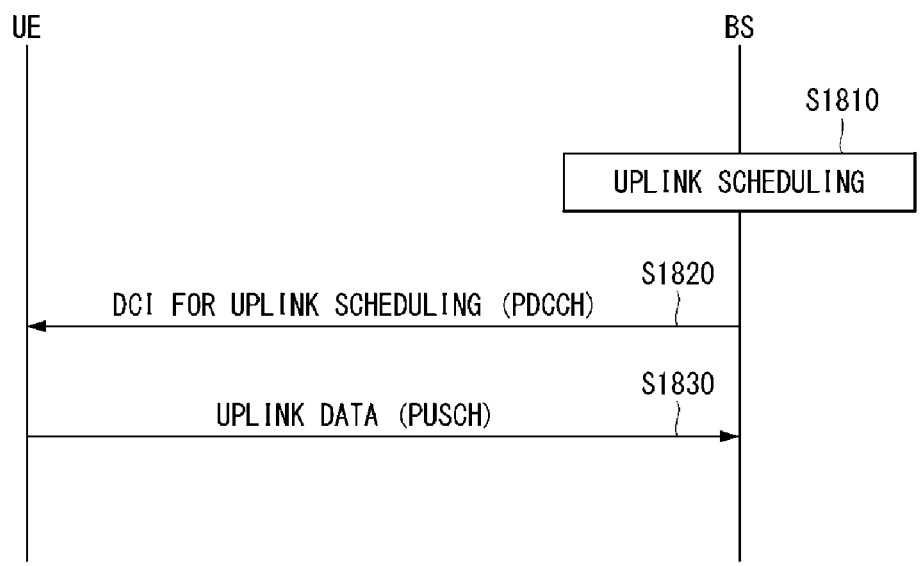

[FIG. 19]
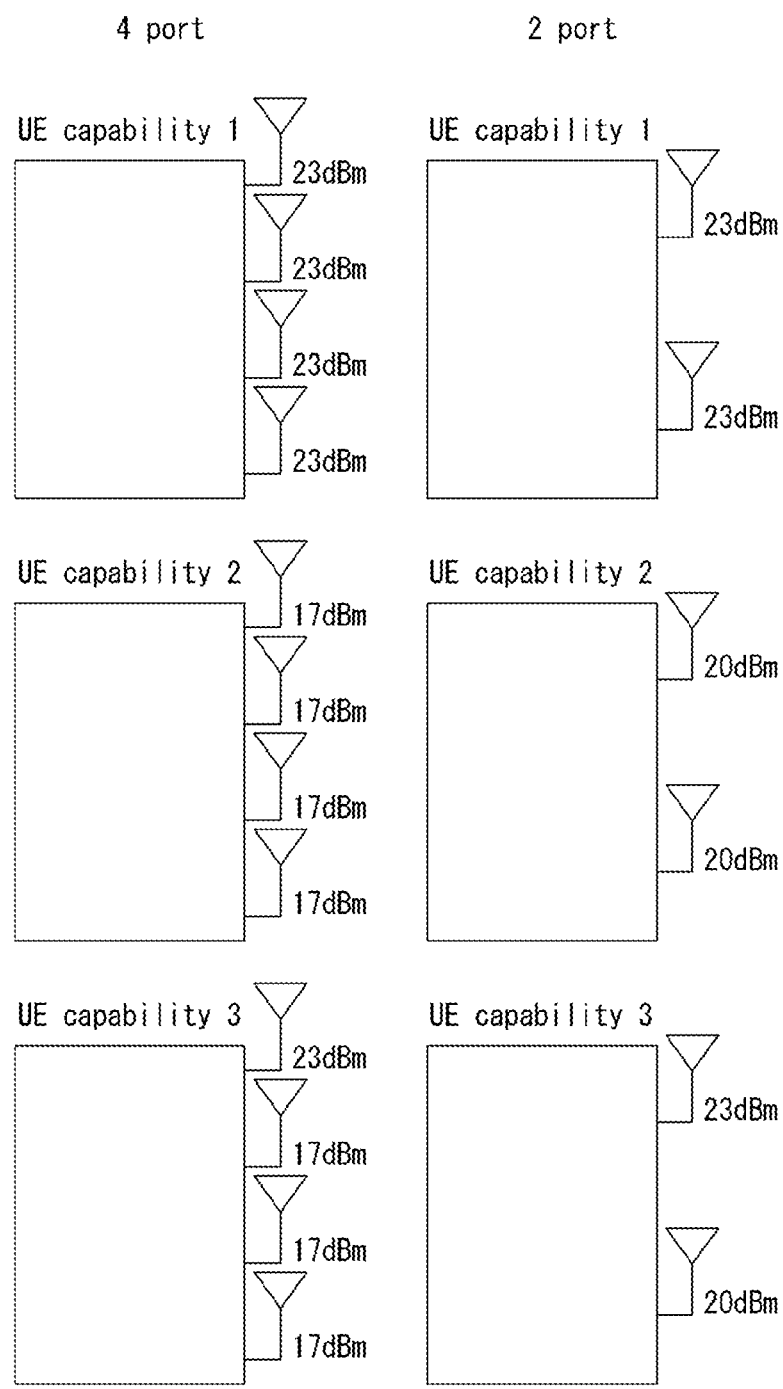

[FIG. 20]
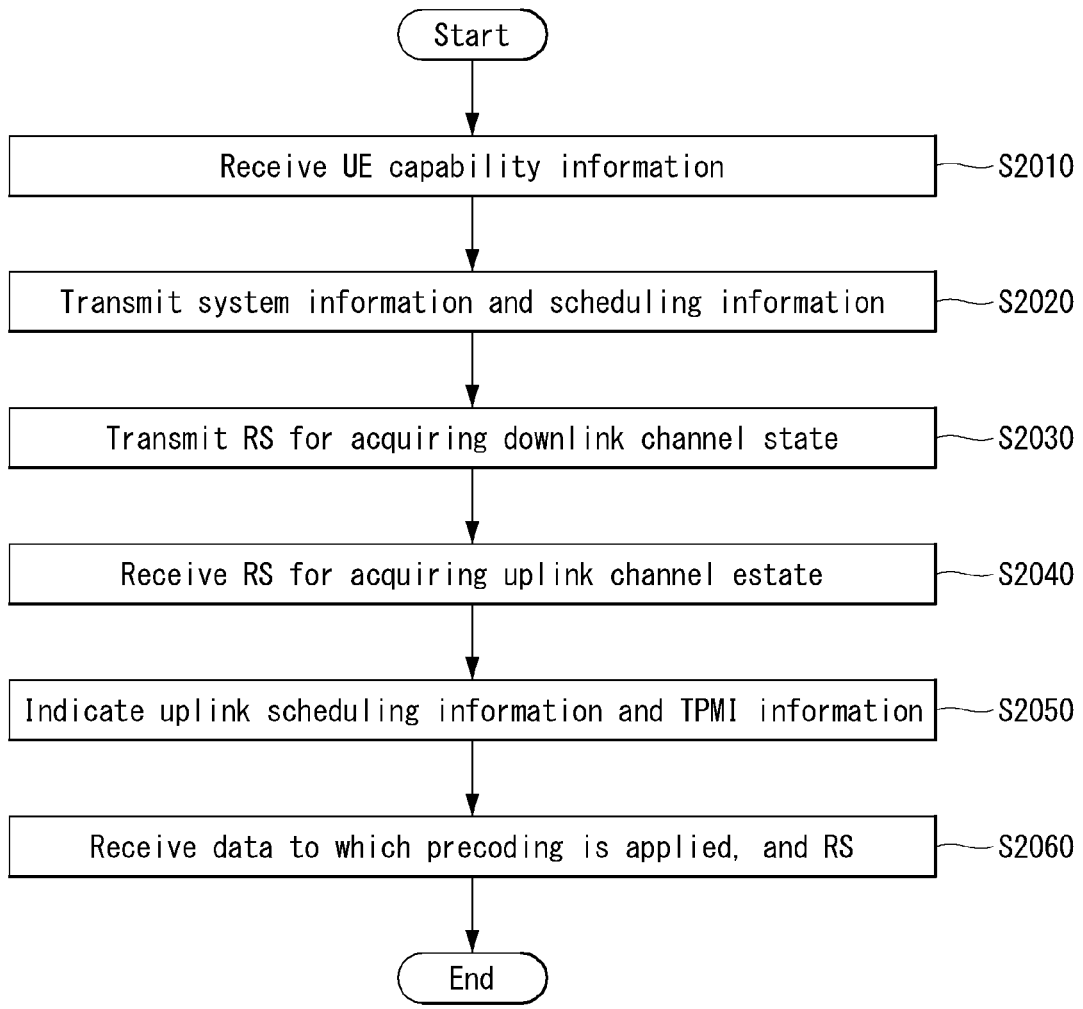

[FIG. 21]
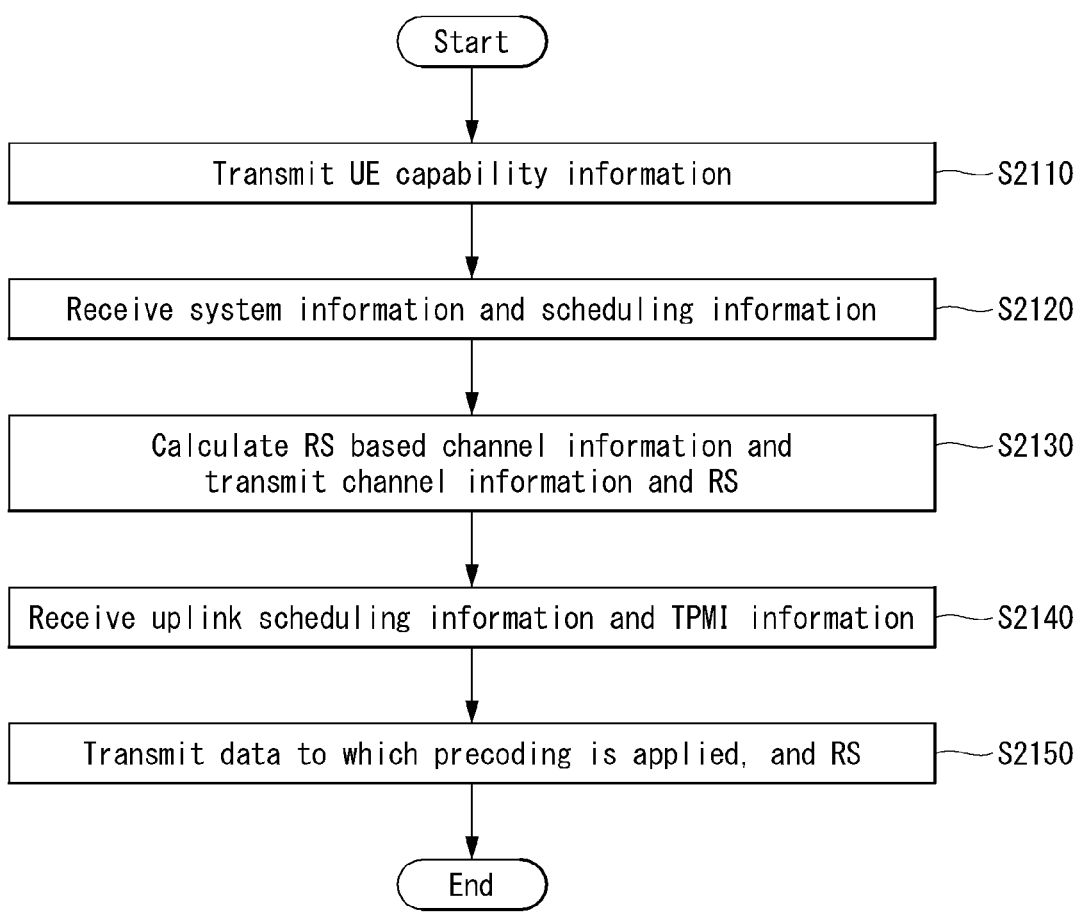

[FIG. 22]
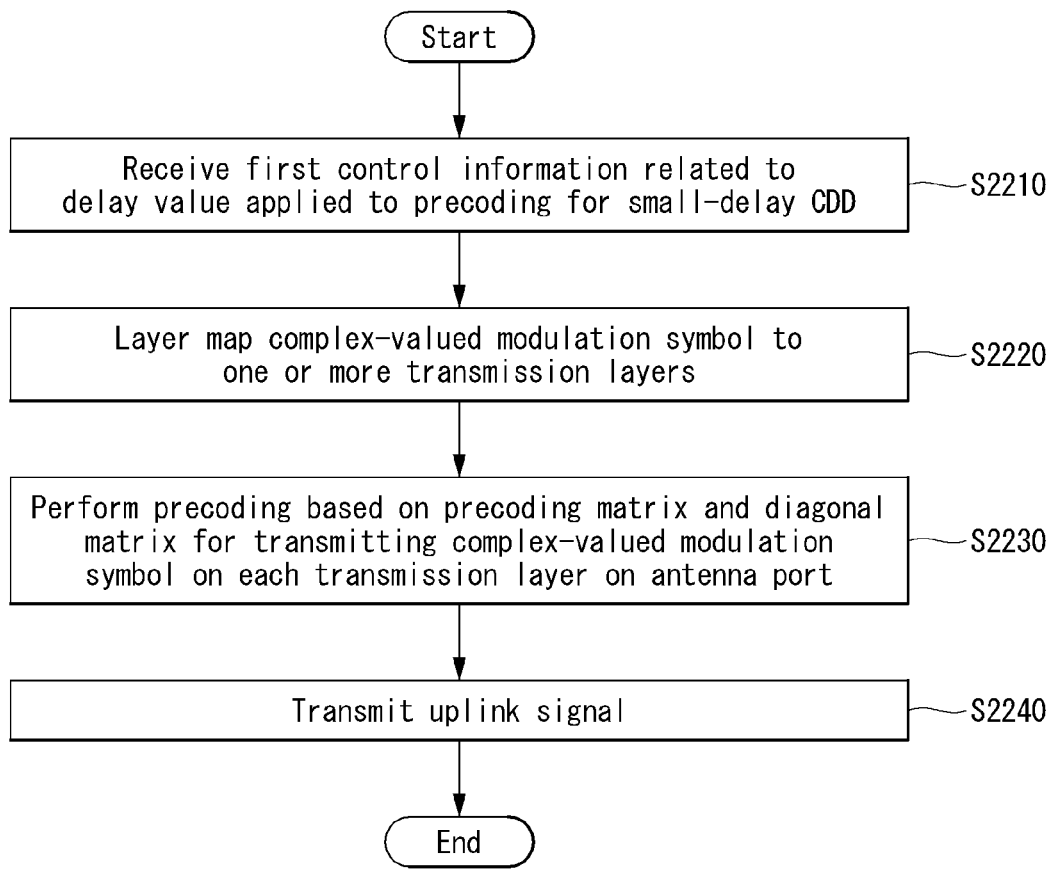

[FIG. 23]
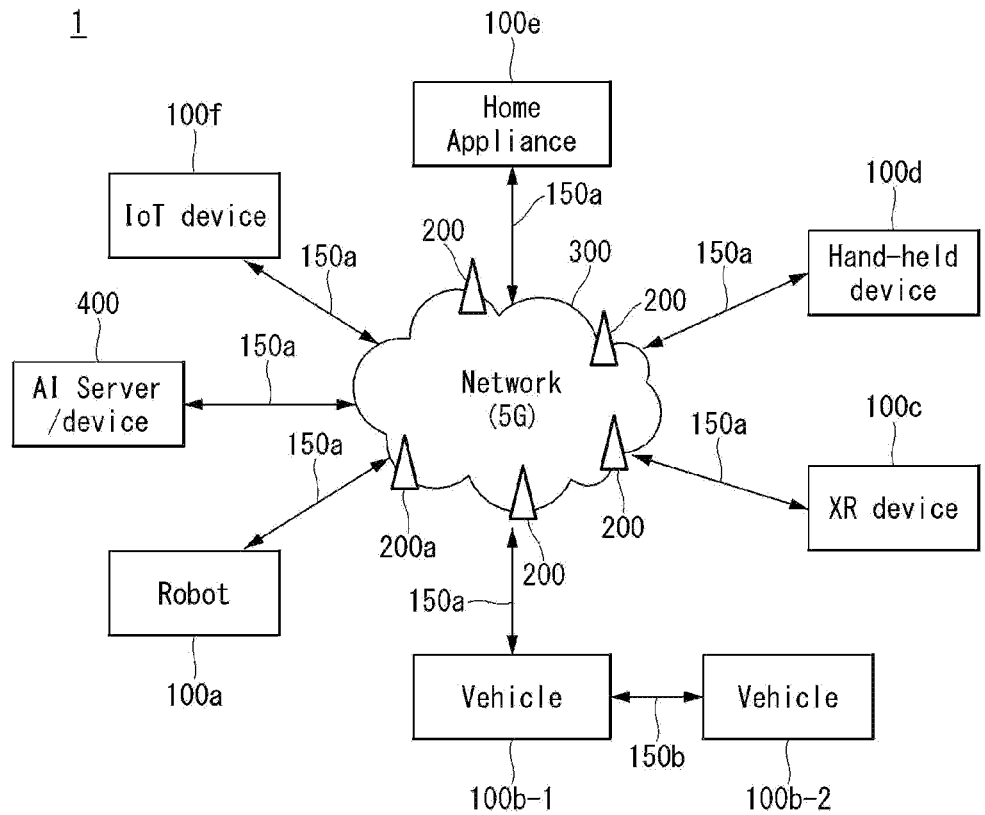
[FIG. 24]
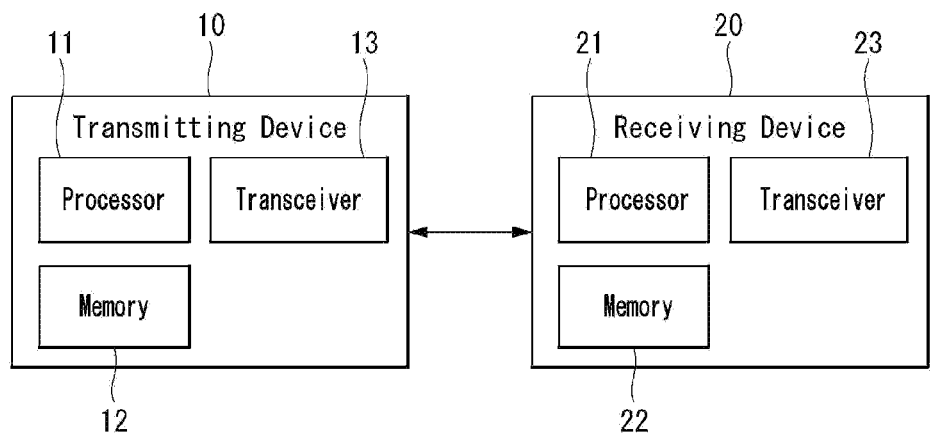

[FIG. 25]
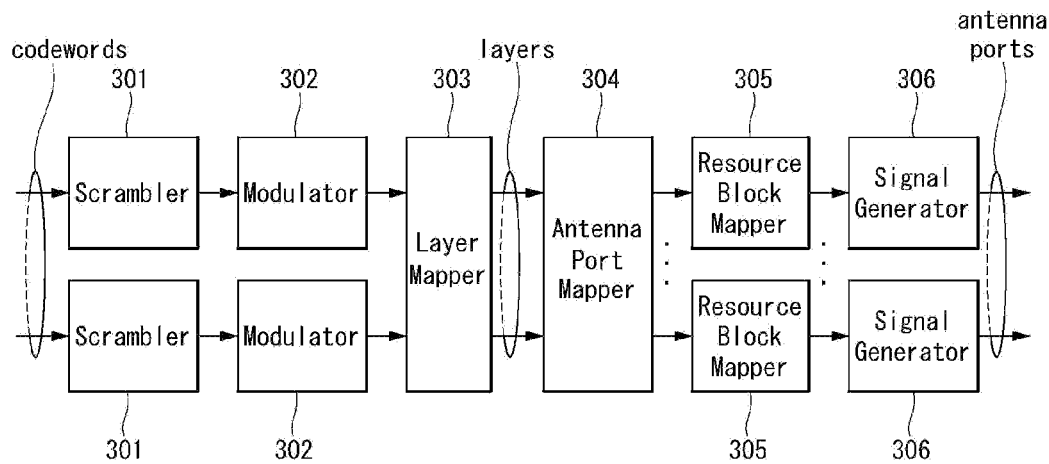
[FIG. 26]
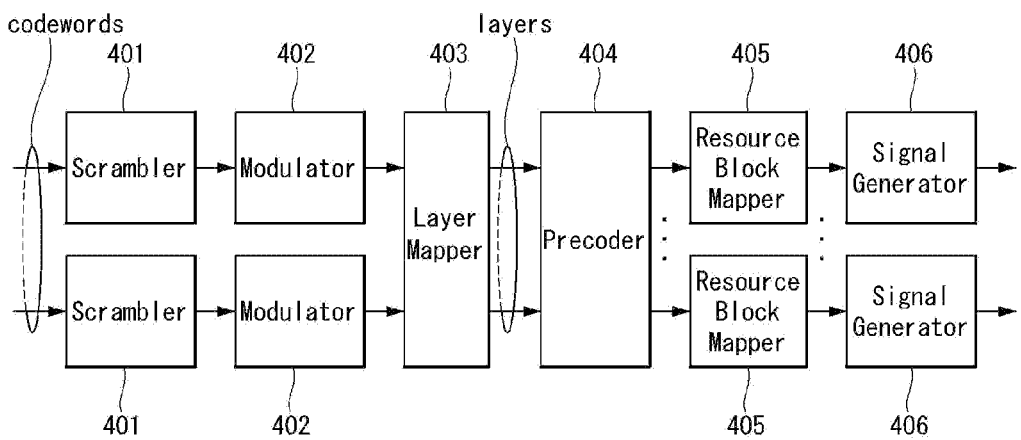

[FIG. 27]
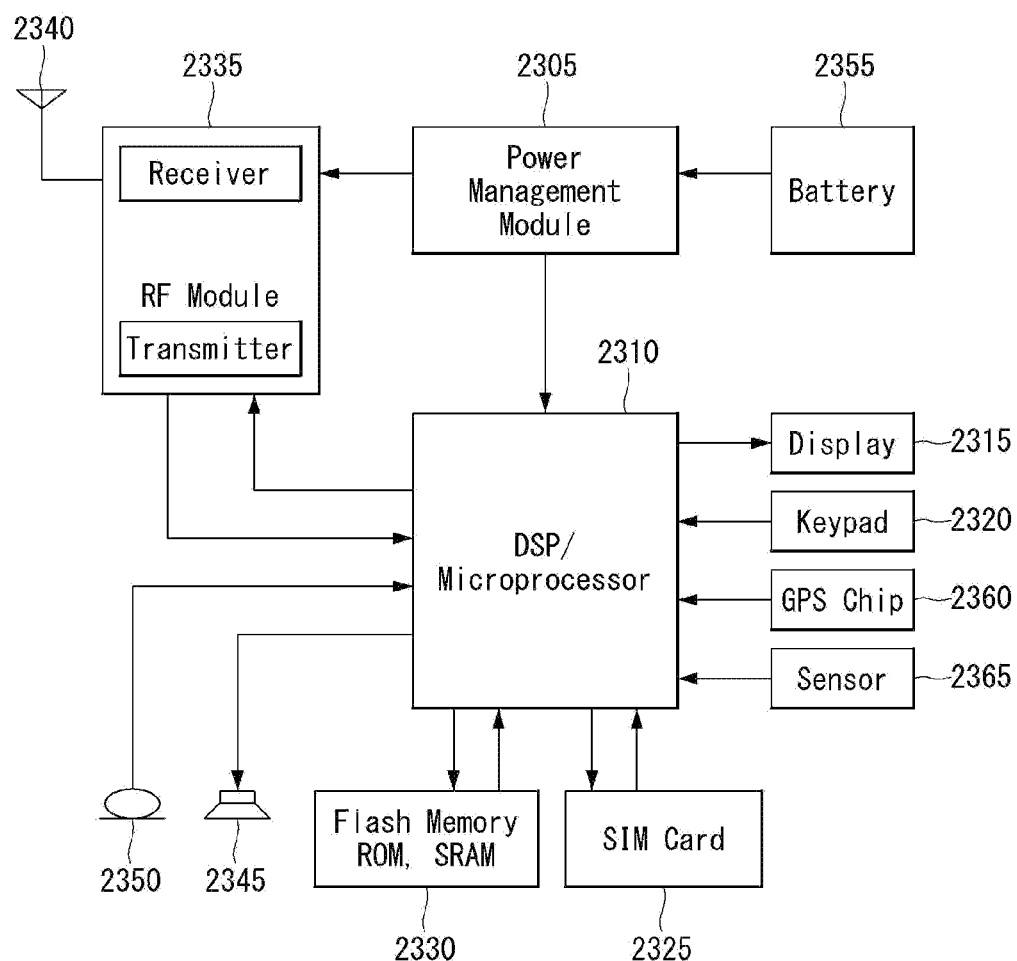

METHOD FOR TRANSMITTING AND RECEIVING SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/004312, filed on Mar. 30, 2020, which claims the benefit of U.S. provisional Application 62/830,361, filed on Apr. 5, 2019, the contents of which are all hereby incorporated by reference herein in their entirety.

TECHNICAL FIELD

The present disclosure relates to a wireless communication system, and more particularly, to a method for transmitting and receiving a signal in a wireless communication system, and an apparatus for supporting the same.

BACKGROUND ART

Wireless communication systems have been widely deployed to provide various types of communication services such as voice and data. In general, the wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The present disclosure provides a method for varying and providing a delay value in order to prevent capability deterioration due to a relative phase difference between ports of a non-coherent UE when applying precoding for small-delay cyclic delay diversity (CDD).

Technical problems to be solved by the present disclosure are not limited by the above-mentioned technical problems, and other technical problems which are not mentioned above can be clearly understood from the following description by those skilled in the art to which the present disclosure pertains.

Technical Solution

In the present disclosure, a method by an user equipment (UE) for transmitting a uplink signal in a wireless communication system, the method comprising: receiving, from a base station, first control information related to a delay value which is applied to precoding for small-delay cyclic delay diversity (CDD); layer mapping complex-valued modulation symbol to at least one transmission layer; performing the precoding, based on a precoding matrix and a diagonal matrix, for transmitting complex-valued modulation symbol on each transmission layer on an antenna port; and transmitting, to the base station, the uplink signal, wherein the diagonal matrix is determined based on the delay value, and wherein the delay value is determined based on the first control information and second control information which is determined based a size of a configured band.

Furthermore, in the present disclosure, wherein the delay value is determined as the first control information/the second control information.

Furthermore, in the present disclosure, wherein the delay value is determined as the first control information/the second control information.

Furthermore, in the present disclosure, wherein the second control information is a smallest number of a set of {128, 256, 512, 1024, 2048} to be greater than or equal to a product of $N_{RB}$ and $N_{sc}^{RB}$, wherein the $N_{RB}$ is a number of resource block (RB) of the configured band, and wherein $N_{sc}^{RB}$ is a number of subcarrier within the RB.

Furthermore, in the present disclosure, receiving the first control information comprising: receiving, from the base station, information on a range of the first control information through higher layer signaling; and receiving, from the base station, downlink control information (DCI) representing a specific value within the range of the first control information.

Furthermore, in the present disclosure, wherein the delay value is configured based on a number of the antenna port and bandwidth configured for transmitting the uplink signal or configured bandwidth part (BWP).

Furthermore, in the present disclosure, wherein the delay value is configured for each the antenna port and/or each antenna port group.

Furthermore, in the present disclosure, wherein the higher layer signaling is RRC signaling or MAC CE.

Furthermore, in the present disclosure, wherein a number of the antenna port is 2 or 4.

Furthermore, in the present disclosure, wherein the first control information is any one value of 0, 1, 2 or 3.

Furthermore, in the present disclosure, an user equipment (UE) for transmitting a uplink signal in wireless communication system, the UE comprising: a transceiver for transceiving a radio signal; and a processor connected to the transceiver, wherein the processor is configured to: receive, from a base station, first control information related to a delay value which is applied to precoding for small-delay cyclic delay diversity (CDD); perform layer mapping complex-valued modulation symbol to at least one transmission layer; perform the precoding, based on a precoding matrix and a diagonal matrix, for transmitting complex-valued modulation symbol on each transmission layer on an antenna port; and transmit, to the base station, the uplink signal, wherein the diagonal matrix is determined based on the delay value, and wherein the delay value is determined based on the first control information and second control information which is determined based a size of a configured band.

Furthermore, in the present disclosure, an apparatus comprising one or more memories and one or more processors operatively coupled to the one or more memories, the apparatus comprising: wherein the one or more processors control the apparatus to: receive, from a base station, first control information related to a delay value which is applied to precoding for small-delay cyclic delay diversity (CDD); perform layer mapping complex-valued modulation symbol to at least one transmission layer; performing the precoding, based on a precoding matrix and a diagonal matrix, for transmitting complex-valued modulation symbol on each transmission layer on an antenna port; and transmit, to the base station, the uplink signal, wherein the diagonal matrix is determined based on the delay value, and wherein the delay value is determined based on the first control information and second control information which is determined based a size of a configured band.

Furthermore, in the present disclosure, one or more non-transitory computer-readable media(CRM) storing one or more instructions, the one or more instructions comprising: receiving, from a base station, first control information related to a delay value which is applied to precoding for small-delay cyclic delay diversity (CDD); performing layer mapping complex-valued modulation symbol to at least one transmission layer; perform the precoding, based on a precoding matrix and a diagonal matrix, for transmitting complex-valued modulation symbol on each transmission layer on an antenna port; and transmitting, to the base station, the uplink signal, wherein the diagonal matrix is determined based on the delay value, and wherein the delay value is determined based on the first control information and second control information which is determined based a size of a configured band.

Advantageous Effects

According to the present disclosure, a delay value applied to precoding for small-delay cyclic delay diversity (CDD) is variably set to prevent capability deterioration due to a relative phase difference between ports of a non-coherent UE and maximize a diversity gain.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 is a diagram illustrating an example of an antenna array to which a method proposed in the present disclosure may be applied.

FIG. 8 is a diagram illustrating an example of a beam used for beam management.

FIG. 9 is a flowchart showing an example of a downlink beam management procedure.

FIG. 10 illustrates an example of a downlink beam management procedure using a Channel State Information-Reference Signal (CSI-RS).

FIG. 11 is a flowchart showing an example of a receive beam determination process of a UE.

FIG. 12 is a flowchart showing an example of a transmit beam determination process of an eNB.

FIG. 13 illustrates an example of resource allocation in time and frequency domains associated with a DL BM procedure using the CSI-RS.

FIG. 14 illustrates an example of an uplink beam management procedure using a Sounding Reference Signal (SRS).

FIG. 15 is a flowchart showing an example of an uplink beam management procedure using the SRS.

FIG. 16 is a flowchart showing an example of a CSI associated procedure to which a method proposed in the present disclosure may be applied.

FIG. 17 is a flowchart showing an example of a downlink transmission/reception operation to which a method proposed in the present disclosure may be applied.

FIG. 18 is a flowchart showing an example of an uplink transmission/reception operation to which a method proposed in the present disclosure may be applied.

FIG. 19 is a diagram illustrating an example of a Radio Frequency (RF) chain of an antenna port to which a method proposed in the present disclosure may be applied.

FIG. 20 is a flowchart showing an operation method of an eNB to which a method proposed in the present disclosure may be applied.

FIG. 21 is a flowchart showing an operation method of a UE to which a method proposed in the present disclosure may be applied.

FIG. 22 is a flowchart showing another operation method of a UE to which a method proposed in the present disclosure may be applied.

FIG. 23 illustrates a communication system applied to the present disclosure.

FIG. 24 illustrates a wireless device which may be applied to the present disclosure.

FIG. 25 illustrates a signal processing circuit for a transmit signal.

FIG. 26 illustrates another example of a signal processing module structure in a transmitting device.

FIG. 27 illustrates an example of a wireless communication device according to an implementation example of the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_R=1/(\Delta f_{max} \cdot N_f)$. In this case, and $\Delta f_{max}=480\cdot 10^3$, and $N_f=4096$. DL and UL transmission is configured as a radio frame having a section of $T_f=(\Delta f_{max} N_f/100)\cdot T_s=10$ ms. The radio frame is composed of ten subframes each having a section of $T_{sf}=(\Delta f_{max} N_f/1000)\cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu$, $N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of $14 \cdot 2^{\mu}$ OFDM symbols, but the present disclosure is not limited thereto.

In the NR system, a transmitted signal is described by one or more resource grids, consisting of $N_{RB}^{\mu} N_{sc}^{RB}$ subcarriers, and symb $2^{\mu} N_{symb}^{(\mu)}$ OFDM symbols, where $N_{RB}^{\mu} \le N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology $\mu$ and antenna port p.

FIG. 5 illustrates examples of a resource grid per antenna port and numerology to which a method proposed in the present disclosure is applicable.

Each element of the resource grid for the numerology $\mu$ and the antenna port p is called a resource element and is uniquely identified by an index pair (k,l̄), where k=0, ..., $N_{RB}^{\mu} N_{sc}^{RB}-1$ is an index on a frequency domain, and l=0, ..., $2^{\mu} N_{symb}^{(\mu)}-1$ refers to a location of a symbol in a subframe. The index pair (k,l̄) is used to refer to a resource element in a slot, where l=0, ..., $N_{symb}^{\mu}-1$.

The resource element (k,l̄) for the numerology $\mu$ and the antenna port p corresponds to a complex value $\alpha_{k,j}^{(p,\mu)}$. When there is no risk for confusion or when a specific antenna port or numerology is not specified, the indexes p and $\mu$ may be dropped, and as a result, the complex value may be $\alpha_{k,j}^{(p)}$ or $\alpha_{k,j}$.

Further, a physical resource block is defined as N R B consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration $\mu$.

The center of subcarrier 0 of common resource block 0 for the subcarrier spacing configuration $\mu$ coincides with 'point A'. A common resource block number $n_{CRB}^{\mu}$ in the frequency domain and resource elements (k,l) for the subcarrier spacing configuration $\mu$ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block n CRB may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

FIG. 7 is a diagram illustrating an example of an antenna array to which a method proposed in the present disclosure may be applied.

In FIG. 7, the normalized panel antenna array may be constituted by Mg panels and Ng panels in a horizontal domain and a vertical domain, respectively.

In this case, one panel is constituted by M columns and N rows, respectively, and an X-pol antenna is assumed in FIG. 7. Therefore, the total number of antenna elements may be 2*M*N*Mg*Ng.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Downlink Beam Management (DL BM)

FIG. 8 is a diagram illustrating an example of a beam used for beam management.

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

As illustrated in FIG. 8, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping.

The Rx beam sweeping using the SSB may be performed while the UE changes the Rx beam for the same SSBRI across multiple SSB bursts. Here, one SS burst includes one or more SSBs and one SS burst set includes one or more SSB bursts.

DL BM Using SSB

FIG. 9 is a flowchart showing an example of a downlink beam management procedure.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S901).

Table 5 shows an example of CSI-ResourceConfig IE and as shown in Table A, a BM configuration using the SSB is not separately defined and the SSB is configured like the CSI-RS resource.

TABLE 5

```
-- ASN1START
-- TAG-CSI-RESOURCECONFIG-START
CSI-ResourceConfig : :-                           SEQUENCE {
    csi-ResourceConfigID                          CSI-ResourceConfigId,
    csi-RS-ResourceSetList                        CHOICE {
        nzp-CSI-RS-SSB                            SEQUENCE {
            nzp-CSI-RS-ResourceSetList            SEQUENCE (SIZE (1..maxNrofNZP-CSI-
RS-ResourceSetsPerConfig)) OF NZP-CSI-RS-ResourceSetId OPTIONAL,
            csi-SSB-ResourceSetList               SEQUENCE (SIZE (1..maxNrofCSI-SSB-
ResourceSetsPerConfig)) OF  CSI-SSB-ResourceSetId     OPTIONAL
        },
        csi-IM-ResourceSetList                    SEQUENCE (SIZE (1..maxNrofCSI-IM-
ResourceSetsPerConfig)) OF CSI-IM-ResourceSetId
    },
    bwp-Id                                        BWP-Id,
    resourceType                                  ENUMERATED { aperiodic, semiPersistent,
periodic },
    . . .
}
-- TAG-CSI-RESOURCECONFIGTOADDMOD--STOP
-- ASN1STOP
```

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

In Table 5, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S920).

When CSI-RS reportConfig associated with reporting of SSBRI and L1-RSRP is configured, the UE (beam) reports to the eNB best SSBRI and L1-RSRP corresponding thereto (S930).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

DL BM Using CSI-RS

In respect to a CSI-RS usage, i) when a repetition parameter is configured in a specific CSI-RS resource set and TRS_info is not configured, the CSI-RS is used for the beam management. ii) When the repetition parameter is not configured and TRS_info is configured, the CSI-RS is used for a tracking reference signal (TRS). iii) When the repetition parameter is not configured and TRS_info is not configured, the CSI-RS is used for CSI acquisition.

The repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none' and CSI-ResourceConfig (higher layer parameter resourcesForChannelMeasurement) for channel measurement includes not higher layer parameter 'trs-Info' but NZP-CSI-RS-ResourceSet in which higher layer parameter 'repetition' is configured, the UE may be configured only with the same number of port (1-port or 2-port) having higher layer parameter 'nrofPorts' for all CSI-RS resources in NZP-CSI-RS-ResourceSet.

When (higher layer parameter) repetition is configured to 'ON', (higher layer parameter) repetition is associated with the Rx beam sweeping procedure of the UE. In this case, when the UE is configured with NZP-CSI-RS-ResourceSet, the UE may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted to different OFDM symbols. Further, the UE does not expect that different periodicities are received at periodicityAndOffset in all CSI-RS resources in NZP-CSI-RS-Resourceset.

On the contrary, when Repetition is configured to 'OFF', the Repetition is associated with the Tx beam sweeping procedure of the eNB. In this case, when repetition is configured to 'OFF', the UE does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through different Tx beams.

FIG. 10 illustrates an example of a downlink beam management procedure using a Channel State Information-Reference Signal (CSI-RS).

FIG. 10(a) illustrates an Rx beam determination (or refinement) procedure of the UE and FIG. 10(b) illustrates a Tx beam sweeping procedure of the eNB. Further, FIG. 10(a) illustrates a case where the repetition parameter is configured to 'ON' and FIG. 10(b) illustrates a case where the repetition parameter is configured to 'OFF'.

Referring to FIG. 10(a) and FIG. 11, an Rx beam determination process of the UE will be described.

FIG. 11 is a flowchart showing an example of a receive beam determination process of a UE.

The UE receives, from the eNB, NZP CSI-RS resource set IE including higher layer parameter repetition through RRC signaling (S1110). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1120).

The UE determines the Rx beam thereof (S1130).

The UE skips CSI report (S1140). In this case, reportQuantity of CSI report config may be configured as 'No report (or None)'.

In other words, the UE may skip the CSI report when repetition 'ON' is configured.

Referring to FIG. 10(b) and FIG. 12, a Tx beam determination process of the eNB will be described.

FIG. 12 is a flowchart showing an example of a transmit beam determination process of an eNB.

The UE receives, from the eNB, NZP CSI-RS resource set IE including higher layer parameter repetition through RRC signaling (S1210). Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1220).

The UE selects (or determines) a best beam (S1230).

The UE reports to the eNB an ID for the selected beam and related quality information (e.g., L1-RSRP) (S1240). In this case, reportQuantity of CSI report config may be configured as 'CRI+L1-RSRP'.

In other words, when the CSI-RS is transmitted for the BM, the UE reports to the eNB the CRI and L1-RSRP therefor.

FIG. 13 illustrates an example of resource allocation in time and frequency domains associated with a DL BM procedure using the CSI-RS.

Specifically, it can be seen that when repetition 'ON' is configured in the CSI-RS resource set, a plurality of CSI-RS resources is repeatedly used by applying the same Tx beam and when repetition 'OFF' is configured in the CSI-RS resource set, different CSI-RS resources are transmitted by different Tx beams.

DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 6 shows an example of TCI-State IE.

The TCI-State IE is associated with a quasi co-location (QCL) type corresponding to one or two DL reference signals (RSs).

TABLE 6

```
-- ASN1START
-- TAG-TCI-STATE-START
TCI-State ::=            SEQUENCE {
   tci-StateId              TCI-StateId,
   qcl-Type1                QCL-Info,
   qcl-Type2                QCL-Info
   ...
}
QCL-Info ::=             SEQUENCE {
   cell                     ServCellIndex
   bwp-Id                   BWP-Id
   referenceSignal          CHOICE {
      csi-rs                   NZP-CSI-ResourceId,
      ssb                      SSB-Index
   },
   qcl-Type                 ENUMERATED (typeA, typeB, typeC, typeD},
   ...
}
-- TAG-TCI-STATE-STOP
-- ASN1STOP
```

In Table 6, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

QCL(Quasi-Co Location)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The US may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication'.

UL BM

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K (≥1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 14 illustrates an example of an uplink beam management procedure using a Sounding Reference Signal (SRS). FIG. 14(*a*) illustrates an Rx beam determination procedure of the eNB and FIG. 14(*b*) illustrates a Tx beam sweeping procedure of the UE.

FIG. 15 is a flowchart showing an example of an uplink beam management procedure using the SRS.

The UE receives, from the eNB, RRC signaling (e.g., SRS-Config IE) including a (higher layer parameter) usage parameter configured as 'beam management' (S15010).

Table 7 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 7

```
-- ASN1START
-- TAG-MAC-CELL-GROUP-CONFIG-START
SRS-Config ::=                                       SEQUENCE {
    srs-ResourceSetToReleaseList                         SEQUENCE (SIZE (1..maxNrofSRS-
ResourceSets)) OF SRS-ResourceSetId                  OPTIONAL, --Need N
    srs-ResourceSetToAddModList                          SEQUENCE (SIZE (1..maxNrofSRS-
ResourceSets)) OF SRS-ResourceSet                    OPTIONAL, -- Need N
    srs-ResourceToReleaseList                            SEQUENCE (SIZE (1..maxNrofSRS-
Resources)) OF SRS-ResourceId                        OPTIONAL, -- Need N
    srs-ResourceToAddModList                             SEQUENCE (SIZE (1..maxNrofSRS-
Resources)) OF SRS-Resources                         OPTIONAL, -- Need N
    tpc-Accumulation                                     ENUMERATED (disabled)
    ...
}
SRS-ResourceSet ::=                                  SEQUENCE {
    srs-ResourceSetId                                    SRS-ResourceSetId,
    srs-ResourceIdList                                   SEQUENCE (SIZE (1..maxNrofSRS-
ResourcesPerSet)) OF SRS-ResourceId                  OPTIONAL, -- Cond Setup
    resourceType                                         CHOICE {
        aperiodic                                            SEQUENCE {
            aperiodicSRS-ResourceTrigger                         INTEGER (1..maxNrofSRS-
TriggerStates-1),
            csi-RS                                               NZP-CSI-RS-ResourceId
            slotOffset                                           INTEGER (1..32)
            ...
        },
        semi-persistent                                      SEQUENCE {
            associatedCSI-RS                                     NZP-CSI-RS-ResourceId
            ...
        },
        periodic                                             SEQUENCE {
            associatedCSI-RS                                     NSP-CSI-RS-ResourceId
            ...
        }
    },
    usage                                                ENUMERATED {beamManagement, code-
book,
nonCodebook, antennaSwitching),
    alpha                                                Alpha
    p0                                                   INTEGER (-202..24)
    pathlossReferenceRS                                  CHOICE {
        ssb-Index                                            SSB-Index,
        csi-RS-Index                                         NZP-CSI-RS-ResourceId
    SRS-SpatialRelationshipInfo ::=                  SEQUENCE {
    servingCellId                                        ServCellIndex
    referenceSignal                                      CHOICE {
        ssb-Index                                            SSB-Index,
        csi-RS-Index                                         NZP-CSI-RS-ResourceId,
        srs                                                  SEQUENCE {
            resourceId                                           SRS-ResourceId,
            uplinkBWP                                            BWP-Id
        }
    }
}
SRS-ResourceId ::=                                   INTEGER (0..maxNrofSRS-Resources-1)
```

In Table 7, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1520). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1530).

More specifically, for P-SRS in which 'SRS-ResourceConfigType' is configured as 'periodic':

ii) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S1540).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to FIG. 14(a).

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to FIG. 16(b).

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

Channel State Information Related Procedure

FIG. 16 is a flowchart showing an example of a CSI associated procedure to which a method proposed in the present disclosure may be applied.

In a New Radio (NR) system, a channel state information-reference signal (CSI-RS) is used for time and/or frequency tracking, CSI computation, layer 1 (L1)-reference signal received power (RSRP) computation, and mobility.

The expression of 'A and/or B' used in the present disclosure may be construed as the same meaning as 'including at least one of A and B'.

The CSI computation is related to CSI acquisition and L1-RSRP computation is related to beam management (BM).

Channel state information (CSI) collectively refers to information that may indicate the quality of a radio channel (or referred to as a link) formed between the UE and the antenna port.

In order to perform one of usages of the CSI-RS, a terminal (e.g., user equipment (UE)) receives, from a base station (e.g., general Node B or gNB), configuration information related to the CSI through radio resource control (RRC) signaling (S1610).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like.

The CSI-IM resource set is identified by a CSI-IM resource set identifier (ID) and one resource set includes at least one CSI-IM resource.

Each CSI-IM resource is identified by a CSI-IM resource ID.

The CSI resource configuration related information defines a group including at least one of a non zero power (NZP) CSI-RS resource set, a CSI-IM resource set, or a CSI-SSB resource set.

In other words, the CSI resource configuration related information may include a CSI-RS resource set list and the CSI-RS resource set list may include at least one of a NZP CSI-RS resource set list, a CSI-IM resource set list, or a CSI-SSB resource set list.

The CSI resource configuration related information may be expressed as CSI-ResourceConfig IE.

The CSI-RS resource set is identified by a CSI-RS resource set ID and one resource set includes at least one CSI-RS resource.

Each CSI-RS resource is identified by a CSI-RS resource ID.

As shown in Table 8, parameters (e.g., a BM related 'repetition' parameter and a tracking related 'trs-Info' parameter) representing the usage may be configured for each NZP CSI-RS resource set.

Table 8 shows an example of NZP CSI-RS resource set IE.

TABLE 8

```
-- ASN1START
-- TAG-NZP-CS1-RS-RESOURCESET-START
NZP-CSI-RS-ResourceSet ::=      SEQUENCE {
    nzp-CSI-ResourceSetId       NZP-CSI-RS-ResourceSetId,
    nzp-CSI-RS-Resources        SEQUENCE (SIZE (1..maxNrofNZP-CSI-RS-
ResourcesPerSet)) OF NZP-CSI-RS-ResourceId,
    repetition                  ENUMERATED { on, off }
    aperiodicTriggeringOffset   INTEGER(0..4)
    trs-Info                    ENUMERATED {true}
    ...
}
-- TAG-NZP-CSI-RS-RESOURCESET-STOP
-- ASN1STOP
```

In Table 8, repetition parameter as a parameter representing whether the same beam is repeatedly transmitted indicates whether the repetition is 'ON' or 'OFF' for each NZP CSI-RS resource set.

The Tx beam used in the present disclosure may be construed as the same meaning as the spatial domain transmission filter and the Rx beam may be construed as the same meaning as the spatial domain reception filter.

For example, when the repetition parameter of Table 8 is configured to 'OFF', the UE does not assume that the NZP CSI-RS resource(s) in the resource set are transmitted with the same spatial domain transmission filter and the same Nrofports in all symbols.

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting.

The time domain behavior may be periodic, aperiodic, or semi-persistent.

In addition, the CSI report configuration related information may be expressed as CSI-ReportConfig IE and Table 9 below shows an example of CSI-ReportConfig IE.

TABLE 9

```
-- ASN1START
-- TAG-CSI-RESOURCECONFIG-START
CSI-ReportConfig ::=                    SEQUENCE {
    reportConfigId                      CSI-ReportConfigId,
    carrier                             ServCellIndex
OPTIONAL, -- Need S
    resourcesForChannelMeasurement      CSI-ResourceConfigId,
    csi-IM-ResourcesForInterference     CSI-ResourceConfigId OPTIONAL, -- Need R
    nzp-CSI-RS-ResourcesForInterference CSI-ResourceConfigId OPTIONAL, --
Need R
    reportConfigType                    CHOICE {
        periodic                        SEQUENCE {
            reportSlotConfig            CSI-ReportPeriodicityAndOffset,
            pucch-CSI-ResourceList      SEQUENCE (SIZE
(1..maxNrofBWPs)) OF PUCCH-CSI-Resource
        },
        semiPersistentOnPUCCH           SEQUENCE {
            reportSlotConfig            CSI-ReportPeriodicityAndOffset,
            pucch-CSI-ResourceList      SEQUENCE (SIZE
(1..maxNrofBWPs)) OF PUCCH-CSI-Resource
        },
        semiPersistentOnPUSCH           SEQUENCE {
            reportSlotConfig            ENUMERATED {sl5, sl10, sl20, sl40, sl80,
sl160, sl320},
            reportSlotOffsetList        SEQUENCE (SIZE (1.. maxNrofUL-
Allocations)) OF INTEGER(0..32),
            p0alpha                     P0-PUSCH-AlphaSetId
        },
        aperiodic                       SEQUENCE {
            reportSlotOffsetList        SEQUENCE (SIZE (1..maxNrofUL-Allocations))
OF INTEGER(0..32)
        }
    },
    reportQuantity                      CHOICE {
        none                            NULL,
        cri-RI-PMI-CQI                  NULL,
        cri-RI-i1                       NULL,
        cri-RI-i1-CQI                   SEQUENCE {
            pdsch-BundleSizeForCSI          ENUMERATED {n2, n4}
OPTIONAL
        },
```

| | |
|---|---|
| cri-RI-CQI | NULL, |
| cri-RSRP | NULL, |
| ssb-Index-RSRP | NULL, |
| cri-RI-LI-PMI-CQI | NULL |
| }, | |

In addition, the UE measures CSI based on configuration information related to the CSI (S1620).

The CSI measurement may include (1) a CSI-RS reception process (S1622) and (2) a process of computing the CSI through the received CSI-RS (S1624).

A sequence for the CSI-RS is generated by Equation 3 below and an initialization value of pseudo-random sequence C(i) is defined by Equation 4.

$$r(m) = \frac{1}{\sqrt{2}}(1 - 2 \cdot c(2m)) + j\frac{1}{\sqrt{2}}(1 - 2 \cdot c(2m+1))$$ [Equation 3]

$$c_{init} = \left(2^{10}\left(N_{symb}^{sint}n_{s,i}^{\mu} + l + 1\right)(2n_{ID} + 1) + n_{ID}\right)\bmod 2^{31}$$ [Equation 4]

In Equations 3 and 4, $n_{s,f}^{\mu}$ represents a slot number in a radio frame and pseudo-random sequence generator is initialized to Cint at a start of each OFDM symbol which is $n_{s,f}^{\mu}$.

In addition, I represents an OFDM symbol number in a slot and $n_{ID}$ is the same as higher-layer parameter scrambling ID.

In addition, for the CSI-RS, resource element (RE) mapping is configured time and frequency domains by higher layer parameter CSI-RS-ResourceMapping.

Table 10 shows an example of CSI-RS-ResourceMapping IE.

TABLE 10

| | |
|---|---|
| row1 | BIT STRING (SIZE (4)), |
| row2 | BIT STRING (SIZE (12)), |
| row4 | BIT STRING (SIZE (3)), |
| other | BIT STRING (SIZE (6)) |
| }, | |
| nrofPorts | ENUMERATED {p1,p2,p4,p8,p12,p16,p24,p32), |
| firstOFDMSymbolInTimeDomain | INTEGER (0..13), |
| firstOFDMSymbolInTimeDomain2 | INTEGER (2..12) |
| cdm-Type | ENUMERATED {noCDM, fd-CDM2, cdM4-FD2-TD2, cdm8-FD2-TD4}, |
| density | CHOICE { |
| dot5 | ENUMERATED {evenPRBs, oddPRBs}, |
| one | NULL, |
| three | NULL, |
| spare | NULL |
| }, | |
| freqBand | CSI-FrequencyOccupation, |
| ... | |
| } | |

In Table 10, a density (D) represents a density of the CSI-RS resource measured in RE/port/physical resource block (PRB) and nrofPorts represents the number of antenna ports.

Further, the UE reports the measured CSI to the eNB (S12030).

Here, in the case where a quantity of CSI-ReportConfig of Table 10 is configured to 'none (or No report)', the UE may skip the report.

However, even in the case where the quantity is configured to 'none (or No report)', the UE may report the measured CSI to the eNB.

The case where the quantity is configured to 'none (or No report)' is a case of triggering aperiodic TRS or a case where repetition is configured.

Here, only in a case where the repetition is configured to 'ON', the UE may be defined to skip the report.

In summary, in the case where the repetition is configured to 'ON' and 'OFF', 'No report', 'SSB Resource Indicator (SSBRI) and L1-RSRP', and 'CSI-RS Resource Indicator (CRI) and L1-RSRP' may be all available as the CSI report.

Alternatively, in the case where the repetition is 'OFF', CSI report of 'SSBRI and L1-RSRP' or 'CRI and L1-RSRP' may be defined to be transmitted and in the case where the repetition is 'ON', 'No report', 'SSBRI and L1-RSRP', or 'CRI and L1-RSRP' may be defined to be transmitted.

CSI Measurement and Reporting Procedure

The NR system supports more flexible and dynamic CSI measurement and reporting.

The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported.

A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching.

In addition, in ZP CSI-RS based IMR, each port emulates an interference layer having (a preferable channel and) precoded NZP CSI-RS.

This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥CSI resource set (given by higher layer parameter csi-RS-ResourceSetList).

Here, the CSI resource setting corresponds to the CSI-RS-resourcesetlist.

Here, S represents the number of configured CSI-RS resource sets.

Here, the configuration for S≥CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id.

In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent.

The number S of configured CSI-RS resource sets is limited to '1' with respect to periodic and semi-persistent CSI resource settings.

Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS—ResourcesForinterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForinterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI measurement related CSI computation will be described.

When interference measurement is performed on CSI-IM, each CSI-RS resource for channel measurement is associated with the CSI-IM resource for each resource by an order of CSI-RS resources and CSI-IM resources within a corresponding resource set.

The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForinterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

In all interference transport layers of the NZP CSI-RS port for interference measurement, an energy per resource element (EPRE) ratio is considered.

Different interference signals on RE(s) of the NZP CSI-RS resource for channel measurement, the NZP CSI-RS resource for interference measurement, or CSI-IM resource for interference measurement.

A CSI reporting procedure will be described in more detail.

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states.

In the aperiodicTriggerStateList, each trigger state includes the channel and an associated CSI-ReportConfigs list optionally indicating resource set IDs for interference.

In the semiPersistentOnPUSCH-TriggerStateList, each trigger state includes one associated CSI-ReportConfig.

In addition, the time domain behavior of CSI reporting supports periodic, semi-persistent, and aperiodic.

Hereinafter, each of periodic, semi-persistent (SP), and aperiodic CSI reporting will be described.

The periodic CSI reporting is performed on short PUCCH and long PUCCH.

The periodicity and slot offset of the periodic CSI reporting may be configured through RRC and refer to the CSI-ReportConfig IE.

Next, SP CSI reporting is performed on short PUCCH, long PUCCH, or PUSCH.

In the case of SP CSI on the short/long PUCCH, the periodicity and the slot offset are configured as the RRC and the CSI reporting to separate MAC CE is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1).

An initial CSI reporting timing follows a PUSCH time domain allocation value indicated in the DCI and a subsequent CSI reporting timing follows a periodicity configured through the RRC.

Separated RNTI (SP-CSI C-RNTI) is used with respect to the SP CSI reporting on the PUSCH.

DCI format 0_1 may include a CSI request field and may activate/deactivate a specific configured SP-CSI trigger state.

In addition, the SP CSI reporting has the same or similar activation/deactivation as a mechanism having data transmission on SPS PUSCH.

Next, the aperiodic CSI reporting is performed on the PUSCH and is triggered by the DCI.

In the case of AP CSI having AP CSI-RS, an AP CSI-RS timing is configured by the RRC.

Here, a timing for the AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE.

Instead, the NR restricts specific CSI reporting not to be configured in the short/long PUCCH and a CSI omission rule is defined.

In addition, in relation with the AP CSI reporting timing, a PUSCH symbol/slot location is dynamically indicated by the DCI. In addition, candidate slot offsets are configured by the RRC.

For the CSI reporting, slot offset(Y) is configured for each reporting setting.

For UL-SCH, slot offset K2 is configured separately.

Two CSI latency classes (low latency class and high latency class) are defined in terms of CSI computation complexity.

The low latency CSI is a WB CSI that includes up to 4 ports Type-I codebook or up to 4-ports non-PMI feedback CSI.

The high latency CSI refers to CSI other than the low latency CSI.

For a normal UE, (Z, Z') is defined in a unit of OFDM symbols.

Z represents a minimum CSI processing time from the reception of the aperiodic CSI triggering DCI to the execution of the CSI reporting.

Z' represents a minimum CSI processing time from the reception of the CSI-RS for channel/interference to the execution of the CSI reporting.

Additionally, the UE reports the number of CSIs which may be simultaneously calculated.

FIG. 17 is a flowchart showing an example of a downlink transmission/reception operation to which a method proposed in the present disclosure may be applied.

The eNB schedules downlink transmission such as a frequency/time resource, a transport layer, a downlink precoder, MCS, etc., (S1710). In particular, the eNB may determine a beam for PDSCH transmission to the UE through the aforementioned operations.

The UE receives Downlink Control Information (DCI) for downlink scheduling (i.e., including scheduling information of the PDSCH) on the PDCCH (S1720).

DCI format 1_0 or 1_1 may be used for the downlink scheduling and in particular, DCI format 1_1 includes the following information which includes: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization In particular, according to each state indicated in an antenna port(s) field, the number of DMRS ports may be scheduled and Single-user (SU)/Multi-user (MU) transmission scheduling is also available.

Further, a TCI field is configured by 3 bits and a maximum of 8 TCI states are indicated according to a TCI field value to dynamically the QCL for the DMRS.

The UE receives downlink data from the eNB on the PDSCH (S1730).

When the UE detects a PDCCH including DCI format 1_0 or 1_1, the UE decodes the PDSCH according to the indication by the corresponding DCI.

Here, when the UE receives a PDSCH scheduled by DCI format 1, a DMRS configuration type may be configured by higher layer parameter 'dmrs-Type' in the UE and the DMRS type is used for receiving the PDSCH. Further, in the UE, the maximum number of front-loaded DMRS symbols for the PDSCH may be configured by higher layer parameter 'maxLength'.

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE.

Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}.

When P' is determined as wideband, the UE does not predict that the PDSCH is scheduled to non-contiguous PRBs and the UE may assume that the same precoding is applied to the allocated resource.

On the contrary, when P' is determined as any one of {2 and 4}, a Precoding Resource Block Group (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE first reads a 5-bit MCD field in the DCI and determines the modulation order and the target code rate. In addition, the UE reads a redundancy version field in the DCI and determines a redundancy version. In addition, the UE determines the transport block size by using the number of layers before rate matching and the total number of allocated PRBs.

FIG. 18 is a flowchart showing an example of an uplink transmission/reception operation to which a method proposed in the present disclosure may be applied.

The eNB schedules uplink transmission such as the frequency/time resource, the transport layer, an uplink precoder, the MCS, etc., (S1810). In particular, the eNB may determine a beam for PUSCH transmission of the UE through the aforementioned operations.

The UE receives DCI for downlink scheduling (i.e., including scheduling information of the PUSCH) on the PDCCH (S1820).

DCI format 0_0 or 0_1 may be used for the uplink scheduling and in particular, DCI format 0_1 includes the following information: Identifier for DCI formats), UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S1830).

When the UE detects a PDCCH including DCI format 0_0 or 0_1, the UE transmits the corresponding PUSCH according to the indication by the corresponding DCI.

Two transmission schemes, i.e., codebook based transmission and non-codebook based transmission are supported for PUSCH transmission:

i) When higher layer parameter txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'. When the UE is set to higher layer parameter 'txConfig' set to 'codebook', at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Precoding

Block vectors $[y^{(0)}(i) \ldots y^{(v-1)}(i)]^T$, $i=0,1,\ldots,M_{symb}^{layer}-1$ may be precoded according to Equation 5 below.

$$\begin{bmatrix} z^{(p_0)}(i) \\ \vdots \\ z^{(p_{p-1})}(i) \end{bmatrix} = W \begin{bmatrix} y^{(0)}(i) \\ \vdots \\ y^{(v-1)}(i) \end{bmatrix} \quad \text{[Equation 5]}$$

In Equation 5, i=0,1, . . . , $M_{symb}^{ap}-1$, $M_{symb}^{ap}=M_{symb}^{layer}$. A set $\{p_0, \ldots, p_{\rho-1}\}$ of antenna ports may be determined according to a procedure related to the PUSCH.

In the non-codebook based transmission, precoding matrix W is the same as an identity matrix. In the codebook based transmission, precoding matrix W may be given by W=1 for single layer transmission in a single antenna port, otherwise, precoding matrix W may be given by Tables 11 to 17 or a procedure related to the PUSCH for the transmit precoding matrix indicator (TPMI) acquired from the DCI for scheduling the uplink transmission.

When higher layer parameter txConfig is not configured, precoding matrix W may be 1.

Table 11 below shows an example of precoding matrix for single layer transmission using two antenna ports.

TABLE 11

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Table 12 below shows an example of precoding matrix for single layer transmission using four antenna ports in which transform precoding is activated.

TABLE 12

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\j\end{bmatrix}$ $\frac{1}{2}\begin{bmatrix}1\\-1\\-1\\-1\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

Table 13 below shows an example of precoding matrix for single layer transmission using four antenna ports in which transform precoding is deactivated.

TABLE 13

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |

TABLE 13-continued

| TPMI index | W (ordered from left to right in increasing order of TPMI index) | | | | | | | |
|---|---|---|---|---|---|---|---|---|
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — |

Table 14 below shows an example of precoding matrix for two layer transmission using two antenna ports in which transform precoding is deactivated.

TABLE 14

| TPMI index | W (ordered from left to right in increasing order of TPMI index) | | |
|---|---|---|---|
| 0-2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

Table 15 below shows an example of precoding matrix for two layer transmission using four antenna ports in which transform precoding is deactivated.

TABLE 15

| TPMI index | W (ordered from left to right in increasing order of TPMI index) | | | |
|---|---|---|---|---|
| 0-3 | $\frac{1}{2}\begin{bmatrix}1 & 0\\0 & 1\\0 & 0\\0 & 0\end{bmatrix}$ | $\frac{1}{2}\begin{bmatrix}1 & 0\\0 & 0\\0 & 1\\0 & 0\end{bmatrix}$ | $\frac{1}{2}\begin{bmatrix}1 & 0\\0 & 0\\0 & 0\\0 & 1\end{bmatrix}$ | $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ | $\frac{1}{2}\begin{bmatrix}0 & 0\\0 & 0\\1 & 0\\0 & 1\end{bmatrix}$ | $\frac{1}{2}\begin{bmatrix}1 & 0\\0 & 1\\1 & 0\\0 & -j\end{bmatrix}$ | $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ | $\frac{1}{2}\begin{bmatrix}1 & 0\\0 & 1\\-j & 0\\0 & -1\end{bmatrix}$ | $\frac{1}{2}\begin{bmatrix}1 & 0\\0 & 1\\-1 & 0\\0 & -j\end{bmatrix}$ | $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ | $\frac{1}{2}\begin{bmatrix}1 & 0\\0 & 1\\j & 0\\0 & -1\end{bmatrix}$ | $\frac{1}{2\sqrt{2}}\begin{bmatrix}1 & 1\\1 & 1\\1 & -1\\1 & -1\end{bmatrix}$ | $\frac{1}{2\sqrt{2}}\begin{bmatrix}1 & 1\\1 & 1\\j & -j\\j & -j\end{bmatrix}$ |
| 16-19 | $\frac{1}{2\sqrt{2}}\begin{bmatrix}1 & 1\\j & j\\1 & -1\\j & -j\end{bmatrix}$ | $\frac{1}{2\sqrt{2}}\begin{bmatrix}1 & 1\\j & j\\j & -j\\-1 & 1\end{bmatrix}$ | $\frac{1}{2\sqrt{2}}\begin{bmatrix}1 & 1\\-1 & -1\\1 & -1\\-1 & 1\end{bmatrix}$ | $\frac{1}{2\sqrt{2}}\begin{bmatrix}1 & 1\\-1 & -1\\j & -j\\-j & j\end{bmatrix}$ |
| 20-21 | $\frac{1}{2\sqrt{2}}\begin{bmatrix}1 & 1\\-j & -j\\1 & -1\\-j & j\end{bmatrix}$ | $\frac{1}{2\sqrt{2}}\begin{bmatrix}1 & 1\\-j & -j\\j & -j\\1 & -1\end{bmatrix}$ | — | — |

Table 16 below shows an example of precoding matrix for three layer transmission using four antenna ports in which transform precoding is deactivated.

| TPMI index | W (ordered from left to right in ioncreasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

Table 17 below shows an example of precoding matrix for four layer transmission using four antenna ports in which transform precoding is deactivated.

TABLE 17

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

Power Control (PC)

In the wireless communication system, transmission power of the terminal (e.g., user equipment (UE) and/or a mobile device may be required to increase or decrease according to a situation. As such, controlling the transmission power of the UE and/or the mobile device may be referred to as uplink power control. As an example, a transmission power control scheme may be applied to satisfy a requirement (e.g., Signal-to-Noise Ratio (SNR), Bit Error Ratio (BER), Block Error Ratio (BLER), etc.) in a base station (e.g., gNB, eNB, etc.).

The power control described above may be performed by an open-loop power control scheme and a closed-loop power control scheme.

Specifically, the open-loop power control scheme means a scheme of controlling the transmission power without a feedback from a transmitting device (e.g., the eNB, etc.) to a receiving device (e.g., UE, etc.) and/or a feedback from the receiving device to the transmitting device. As an example, the UE may receive a pilot channel/signal from the eNB and estimate a strength of reception power by using the received pilot channel/signal. Thereafter, the UE may control the transmission power by using the estimated strength of the reception power.

In contrast, the closed-loop power control scheme means a scheme of controlling the transmission power based on the feedback from the transmitting device to the receiving device and/or the feedback from the receiving device to the transmitting device. As an example, the eNB receives the pilot channel/signal from the UE and determines an optimum power level of the UE based on a power level, SNR, BEER, BLER, etc., measured by the received pilot channel/signal. The eNB may transfer information (i.e., feedback) on the determined optimum power level to the UE through a control channel and the corresponding UE may control the transmission power by using the feedback provided by the eNB.

Hereinafter, a power control scheme for cases where the UE and/or the mobile device performs uplink transmission to the eNB in the wireless communication system will be described in detail.

Specifically, hereinafter, power control schemes for transmission of 1) uplink data channel (e.g., Physical Uplink Shared Channel (PUSCH), 2) uplink control channel (e.g., Physical Uplink Control Channel (PUCCH), 3) Sounding Reference Signal (SRS), and 4) random access channel (e.g., Physical Random Access Channel (PRACH) will be described. In this case, a transmission occasion (i.e., transmission time unit) (i) for PUSCH, PUCCH, SRS, and/or PRACH may be defined by slot index n_s in a frame in of a system frame number(SFN), a first symbol S in the slot, the number L of consecutive symbols, etc.

Power Control of Uplink Data Channel

Hereinafter, for convenience of description, the power control scheme will be described based on the case where the UE performs PUSCH transmission. The corresponding scheme may be extensively applied to another uplink data channel supported in the wireless communication system, of course.

In PUSCH transmission in an active uplink UL bandwidth part (UL BWP) of carrier f of serving cell c, the UE may calculate a linear power value of the transmission power determined by Equation P1 below. Thereafter, the corresponding UE may control the transmission power by considering the calculated linear power value, the number of antenna ports, and/or the number of SRS ports.

Specifically, when the UE performs PUSCH transmission in active UL BWP(b) of carrier f of serving cell c using a parameter set configuration based on index j and a PUSCH power control adjustment state based on index I, the UE may determine PUSCH transmission power $P_{PUSCH,b,f,c}(i, j, q_d, l)$ (dBm) in PUSCH transmission occasion i based on Equation 6 below.

may be configured or indicated based on a TPC command field of DCI (e.g., DCI format 0_0, DCI format 0_1, DCI format 2_2, DCI format2_3, etc.).

In this case, a specific Radio Resource Control (RRC) parameter (e.g., SRI-PUSCHPowerControl-Mapping, etc.)

$$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{Bmatrix} [dBm] \quad \text{[Equation 6]}$$

In Equation 6, index j represents an index for an open-loop power control parameter (e.g., Po, alpha (α) etc.) and a maximum of 32 parameter sets per cell may be configured. Index q_d represents an index of a DL RS resource for pathloss (PL) measurement (e.g., $PL_{b,f,c}(q_d)$) and a maximum of four measurement values per cell may be configured. Index I represents an index for a closed-loop power control process and a maximum of two processes per cell may be configured.

Specifically, Po (e.g., $P_{O\_PUSCHb,f,c}(j)$) as a parameter broadcasted to a part of system information may represent target reception power at a receiver. The corresponding Po value may be configured by considering a throughput of the UE, a capacity of the cell, noise, and/or interference. Further, an alpha (e.g., $\alpha_{b,f,c}(j)$) may represent a ratio of performing compensation for pathloss. The alpha may be configured to a value of 0 to 1 and full pathloss compensation or fractional pathloss compensation may be performed according to the configured value. In this case, the alpha value may be configured interference between the UEs and/or a data speed. Further, $P_{CMAX,f,c}(i)$ may represent configured UE transmit power. As an example, the configured UE transmit power may be construed as 'configured maximum UE output power' defined in 3GPP TS 38.101-1 and/or TS38.101-2. Further, $M_{RB,b,f,c}^{PUSCH}(i)$ may represent a bandwidth of PUSCH resource allocation expressed as the number of resource blocks (RBs) for the PUSCH transmission occasion based on subcarrier spacing μ. Further, $f_{b,f,c}(i,l)$ related to the PUSCH power control adjustment state may represent a linkage between the SRS Resource Indicator (SRI) field of downlink control information (DCI) and the indexes j, q_d, and l. In other words, the indexes j, l, and q_d may be associated with a beam, a panel, and/or a spatial domain transmission filter based on specific information. Therefore, beam, panel. And/or spatial domain transmission filter unit PUSCH transmission power control may be performed.

Parameters and/or information for the PUSCH power control may be individually (i.e., independently) configured for each BWP. In this case, the parameters and/or information may be configured or indicated through higher layer signaling (e.g., RRC signaling, Medium Access Control-Control Element (MAC-CE), etc.) and/or DCI. As an example, the parameter and/or information for the PUSCH power control may be transferred through RRC signaling PUSCH-ConfigCommon, PUSCH-PowerControl, etc., and PUSCH-ConfigCommon and PUSCH-PowerControl may be configured as shown in Table 18 below.

TABLE 18

| | |
|---|---|
| PUSCH-ConfigCommon ::= | SEQUENCE { |
| groupHoppingEnabledTransformPrecoding | ENUMERATED {enabled} |
| pusch-TimeDomainAllocationList | PUSCH- |
| TimeDomainResourceAllocationList | |
| msg3-DeltaPreamble | INTEGER (–1..6) |
| p0-NominalWithGrant | INTEGER (–202..24) |
| ... | |
| } | |
| PUSCH-PowerControl ::= | SEQUENCE { |
| tpc-Accumulation | ENUMERATED { disabled } |
| msg3-Alpha | Alpha |
| p0-NominalWithoutGrant | INTEGER (–202..24) |
| p0-AlphaSets | SEQUENCE (SIZE (1..maxNrofP0- |
| PUSCH-AlphaSets)) OF P0-PUSCH-AlphaSet | |
| pathlossReferenceRSToAddModList | SEQUENCE (SIZE |
| (1..maxNrofPUSCH-PathlossReferenceRSs)) | OF PUSCH- |
| PathlossReferenceRS | |
| pathlossReferenceRSToReleaseList | SEQUENCE (SIZE |
| (1..maxNrofPUSCH-PathlossReferenceRSs)) | OF PUSCH- |
| PathlossReferenceRS-Id | |
| twoPUSCH-PC-AdjustmentStates | ENUMERATED {twoStates} |
| deltaMCS | ENUMERATED {enabled} |
| sri-PUSCH-MappingToAddModList | SEQUENCE (SIZE |
| (1..maxNrofSRI-PUSCH-Mappings)) OF SRI-PUSCH-PowerControl | |
| sri-PUSCH-MappingToReleaseList | SEQUENCE (SIZE |
| (1..maxNrofSRI-PUSCH-Mappings)) OF SRI-PUSCH-PowerControlId | |
| } | |

The UE may determine or calculate the PUSCH transmission power through the scheme and transmit the PUSCH by using the determined or calculated PUSCH transmission power.

In respect to the PUSCH transmission, there may be the following methods for uplink full power transmission.

Option 1: Refinement/adjustment of an uplink codebook may be supported

Option 1-1: The UE may support a new codebook subset for non-coherent and partial-coherent transmittable UE.

Option 1-2: Additional scaling factor for the uplink codebook

Option 2: The UE may transparently apply small cyclic or linear delay.

Option 3: Supporting a power control mechanism modified to support the uplink full power transmission without precluding the use of maximum rated PA Option 4: may depend on implementation of the UE for UE capability signaling of uplink full power transmission.

Uplink transmission of the full transmission power through multiple power amplifiers for the codebook based uplink transmission for non-coherent and partial-coherent capable UEs may be supported.

The following options may be additionally considered in relation with the uplink transmission of the full transmission power.

Option 5: In the case of a precoder in which entries are 0, a linear value $P_{PUSCH,b,f,c}(i, j, q_d, l)$ of the PUSCH transmission power may be scaled by a ratio αRel-16. A value of αRel-16 may be selected up to a range in which the UE is implemented within a range of [αRel-16, 1]. αRel-16 represents the number of antenna ports having non-zero PUSCH transmission power and the number of antenna ports configured for a PUSCH transmission scheme defined in the NR Rel-15 specification The UE may be required to maintain a consistent αRel-16 value in different cases of PUSCH transmission by using the same precoder for the PUSCH.

The full transmission power uplink transmission having multiple power amplifiers may be at least supported for the codebook based uplink transmission for the coherent and partial/non-coherent capable UEs. Supporting such a feature may be represented by the UE as a part of UE capability signaling.

In the case of power class 3:

UE Capability 1: Full rated PA of each Tx chain may be supported with a new UE function so that the UE may support full Tx power in UL transmission.

UE Capability 2: It may be assumed that there is no transmission chain of full power with the new UE function in order for the UE to support the full transmission power in the UL transmission.

UE Capability 3: A subset of Tx chains having all class PA may be supported as a new UE function in order for the UE to support full Tx power in UL transmission.

Precoding for zero-delay and small-delay cyclic delay diversities (CDDs) is described in brief.

For the zero-delay and small-delay CDDs, spatial multiplexing may be defined as in Equation 7 below.

$$\begin{bmatrix} y^{(0)}(i) \\ \vdots \\ y^{(P-1)}(i) \end{bmatrix} = D(k_i)W(i) \begin{bmatrix} x^{(0)}(i) \\ \vdots \\ x^{(v-1)}(i) \end{bmatrix}$$ [Equation 7]

Here, a precoding matrix w(i) has a size of P×v. A quantity $D(k_i)$ is a diagonal matrix for supporting the CDD. $k_i$ represents a frequency-domain index of a resource element to which a complex-valued symbol y(i) is mapped, and $i=0,1,\ldots,M_{symb}^{ap}-1$, $M_{symb}^{ap}=M_{symb}^{layer}$.

The diagonal matrix $D(k_i)$ may be selected in Table 19 below. Here, a UE-specific value of δ is semi-statically in the UE and the eNB by higher layer signaling.

In Table 19 below, a quantity η is a smallest number from a set {128,256,512,1024,2048}, and $\eta \geq N_{RB}^{DL} N_{sc}^{RB}$.

TABLE 19

| Set of antenna ports used | Number of layers υ | $D(k_i)$ | δ No CDD | δ Small delay |
|---|---|---|---|---|
| {0, 1} | 1 2 | $\begin{bmatrix} 1 & 0 \\ 0 & e^{-j2\pi \cdot k_i \cdot \delta} \end{bmatrix}$ | 0 | 2/η |
| {0, 1, 2, 3} | 1 2 3 4 | $\begin{bmatrix} 1 & 0 & 0 & 0 \\ 0 & e^{-j2\pi \cdot k \cdot \delta} & 0 & 0 \\ 0 & 0 & e^{-j2\pi \cdot k \cdot 2\delta} & 0 \\ 0 & 0 & 0 & e^{-j2\pi \cdot k \cdot 3\delta} \end{bmatrix}$ | 0 | 1/η |

In respect to the spatial multiplexing, w(i) values may be selected between precoder elements in codebooks configured by the UE and the eNB. The eNB may additionally limit a precoder selection in the UE as a subset of elements in a codebook using a codebook subset restriction.

FIG. 19 is a diagram illustrating an example of a Radio Frequency (RF) chain of an antenna port to which a method proposed in the present disclosure may be applied.

More specifically, FIG. 19 illustrates an example of 2-port and 4-port implementation of power class 3 (PC3) according to UE capabilities.

Hereinafter, a method for effectively applying a small-delay CDD method for supporting full power transmission at the time of uplink MIMO transmission using a codebook proposed in the present disclosure will be described.

For reference, coherent described in the present disclosure means that a phase relationship between two signals is fixed, and in other words, a transmission/reception signal structure synchronizing phases is referred to as coherent. Coherent scheme transmission/reception is a scheme in which phases of an LO signal of a transmitter and an LO signal of a receiver should be synchronized with each other. That is, the coherent scheme transmission/reception is a case where a phase is locked between the receiver and the transmitter. A case where the phase is not locked is referred to as non-coherent. In the case of coherent detection, the receiver should accurately match the transmit signal and the phase, while in the case of the non-coherent, since the receiver need not accurately match the transmit signal and the phase, a structure of the receiver becomes simple.

First Embodiment

The first embodiment relates to a method in which the eNB configures, to the UE, information on a delay value of the small-delay CDD when applying the small-delay CDD for the full power transmission of the UE.

In particular, like UE capability 2 of FIG. 19, by a restriction of a maximum transmission power of the UE, for example, in the case of power class 3 (PC3), 2-port transmission, it is difficult to achieve 23 dBm by port-selection transmitted precoding matrix indicator (TPMI) indices 0 and 1 ([1 0]T or [0 1]T (here, a scaling factor will be omitted for convenience of description) using only one port. Accordingly, even in the case of the non-coherent UE, it is necessary to mitigate a codebook subset so as to use some or all of TPMI indices 2 to 5. Alternatively, the subset restriction may be limited to a specific rank or independently applied/configured for each rank.

Then, when a fully coherent TPMI such as TPMI index [11] is used, capability deterioration is anticipated between the ports of the non-coherent UE due to a relative phase difference.

Accordingly, a delay for each port may be reflected as in Table 20 below, and $\alpha_i$ (i=2 or 4, which corresponds to the number of ports, e.g, $\alpha_i \in \{0,1,2,3\}$)) for determining a value of the delay value may be configured/indicated to the UE by the eNB. A different point of the above-described scheme from legacy LTE is an advantage in that the delay value of the small-delay CDD of the LTE is a value fixed by a band configured by the number of antenna ports and a band configured by PUSCH transmission, while in the case of NR, a more free configuration is possible through a configuration of a BWP, and as a result, this is reflected to indicate an optimal delay value to maximize the diversity gain to the UE. Here, a configuration example of $\alpha_i$ may include the followings.

(Method 1)

The eNB may configure a range of $\alpha_i$ to the UE through higher layer signaling (e.g., RRC signaling and MAC CE), and dynamically configure/indicate, to the UE, an optimal delay value through DCI (scheduling the PUSCH). The UE applies the value finally indicated (through the DCI) to a calculation of a PUSCH precoder. In this case, in order to reduce overhead of the DCI, a smaller bit-width (e.g., 1 bit) than the RRC signaling or MAC CE may also be indicated to the UE.

(Method 2)

The eNB may configure a value of $\alpha_i$ to the UE through the higher layer signaling (e.g., RRC signaling or MAC CE), and the UE may apply the configured value of $\alpha_i$ to a calculation of the PUSCH precoder.

(Method 3)

The eNB may configure a range of $\alpha_i$ to the UE through the RRC signaling, and configure/indicate an optimal delay value to the UE through the MAC CE signaling. The UE may apply the finally indicated value (configured/indicated through the MAC CE signaling) to the calculation of a PUSCH precoder.

Here, as an example of $\alpha_i$, $\alpha_i \in \{0,1,2,3\}$, etc., may be considered, but in the case of the non-coherent UE, an inter-port phase difference problem occurs, and as a result, it may be inefficient that a value of 0 is included as a candidate set. It may be promised (by the eNB/UE) that a set of the $\alpha_i$ value in SD-CDD for a non-coherent or partial-coherent UE does not include 0 (zero-delay). Table 20 shows an example of the small-delay CDD.

TABLE 20

| Set of antenna ports used | Number of layers $\upsilon$ | D(k) | $\delta$ Small delay |
|---|---|---|---|
| {0, 1} | 1 | $\begin{bmatrix} 1 & 0 \\ 0 & e^{-j2\pi \cdot k \cdot \delta} \end{bmatrix}$ | $\alpha_2/\eta$ |
| | 2 | | |
| {0, 1, 2, 3} | 1 | $\begin{bmatrix} 1 & 0 & 0 & 0 \\ 0 & e^{-j2\pi \cdot k \cdot \delta} & 0 & 0 \\ 0 & 0 & e^{-j2\pi \cdot k \cdot 2\delta} & 0 \\ 0 & 0 & 0 & e^{j2\pi \cdot k \cdot 3\delta} \end{bmatrix}$ | $\alpha_4/\eta$ |
| | 2 | | |
| | 3 | | |
| | 4 | | |

Precoding for spatial multiplexing when using the SD-CDD may be defined by Equation 8.

$$\begin{bmatrix} y^{(0)} \\ \vdots \\ y^{(P-1)} \end{bmatrix} = D(k)W \begin{bmatrix} x^{(0)} \\ \vdots \\ X^{(\upsilon-1)} \end{bmatrix} \quad \text{[Equation 8]}$$

A precoding matrix W (which may be indicated by the TPMI) has a size of P×ʋ. A quantity D(k) is a diagonal matrix for supporting the CDD. k represents a frequency-domain index of a resource element to which a complex-valued symbol y(i) is mapped, and P represents the number of ports. In Table 20 above, a quantity η is a smallest number from a set {128,256,512,1024,2048} to become $\eta \geq N_{RB}^{DL} N_{sc}^{RB}$. Here, $N_{RB}$ represents the number of RBs of an (uplink) configured BW or BWP, and $N_{sc}^{RB}$ represents the number of subcarriers in the RB.

Second Embodiment

When the small-delay CDD is applied for the full power transmission of the UE, the eNB may configure/indicate, to the UE, a delay value of the small-delay CDD independently for each port or each port group.

In a case where the delay value is configured for each port of the UE, a diagonal matrix shown in Equation 9 below may be considered.

$$D(k) = \begin{bmatrix} 1 & 0 & 0 & 0 \\ 0 & e^{-j2\pi \cdot k \cdot \delta_1} & 0 & 0 \\ 0 & 0 & e^{-j2\pi \cdot k \cdot \delta_2} & 0 \\ 0 & 0 & 0 & e^{-j2\pi \cdot k \cdot \delta_3} \end{bmatrix} \quad \text{[Equation 9]}$$

Here, $\delta_1$, $\delta_2$, $\delta_3$ are delay values which may be independently configured, and there is an advantage in that the delay value per port may be configured most flexibly, but there is a disadvantage in that signaling overhead is large. The second embodiment may be used usefully primarily for the non-coherent UE. To this end, except for the coherent UE, the diagonal matrix of Table 20 expressed by one representative value may also be used as it is in order to reduce the signaling overhead.

When the UE indicates the delay for each port group, the corresponding port group may interlock with a UE capability. That is, it may be appreciated that in the case of 4-port, the case where the delay value is indicated for each port group is applied only to the partial-coherent UE. When a configuration of 4-port TPMIs applied to current NR is described, the codebook is configured by assuming that coherent transmission is possible in ports #1 and #3 and coherent transmission is possible in ports #2 and #4.

That is, the coherent transmission is impossible between port groups {1,3} and {2,4}. Accordingly, a delay matrix shown in Equation 10 below may be considered by using the structure.

$$D(k) = \begin{bmatrix} 1 & 0 & 0 & 0 \\ 0 & e^{-j2\pi \cdot k \cdot \delta_1} & 0 & 0 \\ 0 & 0 & e^{-j2\pi \cdot k \cdot \delta_2} & 0 \\ 0 & 0 & 0 & e^{-j2\pi \cdot k \cdot (\delta_1+\delta_2)} \end{bmatrix} \quad \text{[Equation 10]}$$

It is characterized in that the delay matrix of Equation 10 is constituted by $\delta_2$ which is a component representing a delay between port groups and $\delta_1$ giving a small delay between coherent ports in the port. Here, values of $\delta_1$ and $\delta_2$ may be configured/indicated to the UE by using independent delay sets, respectively, and configured/indicated signaling may also be different. For example, the value of $\delta_2$ may adopt a value configured/indicated through the RRC signaling or MAC CE, and as the value of $\delta_1$, a value configured and applied/indicated through the DCI may be used.

Third Embodiment

As the delay values of the first and second embodiments, the UE may recommend values calculated and preferred based on a channel reciprocity/capability to the eNB.

Alternatively, the value calculated and preferred based on the channel reciprocity/capability by the UE may be recorded/reported to the eNB, and in the first and second embodiments, the delay value which the eNB configures/indicates, to the UE, through the RRC signaling and/or MAC CE signaling may also be based on the delay value recommended/reported by the UE.

Fourth Embodiment

The eNB may configure/indicate, to the UE, a plurality of beamformed SRS resource sets precoded with different delay values, respectively for the purpose of increasing accuracy of the delay calculation for applying the SD-CDD. The UE may transmit, to the eNB, a plurality of SRS resources in the SRS resource set by a (consecutive) TDM or FDM scheme.

In the fourth embodiment, the eNB may promise information on a delay value to be used and the number of applied resources in advance, or the information on the delay value or the number of applied resources may be determined by a capability of the UE or separately configured/indicated to the UE by the eNB.

Operation flows of the eNB and the UE for the first to fourth embodiments described above may be illustrated in FIGS. 20 to 22. The operations of the eNB and the UE may be based on the uplink transmission/reception operation described above, and some of respective steps may be added as described in the first to fourth embodiments.

FIG. 20 is a flowchart showing an operation method of an eNB to which a method proposed in the present disclosure may be applied.

First, an eNB receive, from a UE, UE capability information (e.g., #of supported port, coherency capability, full power transmission capability) (S2010).

In addition, the eNB transmits, to the UE, system information and scheduling information through a higher layer (e.g., RRC signaling or MAC CE) (S2020).

In addition, the eNB transmits an RS (e.g., SRSSB, CSI-RS, TRS, PT-RS, etc.) in order to acquire a downlink channel state (S2030).

In addition, the eNB receives, from the UE, an RS (e.g., SRS) in order to acquire uplink channel state information of the UE (S2040).

In addition, the eNB indicates/configures, to the UE, uplink scheduling information and SRI/TPMI/TRI/MCS information in order to utilize channel information acquired from the UE (S2050).

In addition, the eNB receives, from the UE, data to which precoding (e.g., small delay CDD) described above is applied and an RS (e.g., DMRS) (scheduled) for data decoding.

FIG. 21 is a flowchart showing an operation method of a UE to which a method proposed in the present disclosure may be applied.

First, an UE transmits, to an eNB, UE capability information (e.g., #of supported port, coherency capability, full power transmission capability) (S2110).

In addition, the UE receives, from the UE, system information and scheduling information through a higher layer (e.g., RRC or MAC CE) (S2120).

In addition, the UE calculates channel information based on the RS received from the eNB, and transmits, to the eNB, downlink channel information calculated based thereon, and the RS (e.g., SRS) (S2130).

In addition, the UE receives, from the eNB, uplink scheduling information and SRI/TPMI/TRI/MCS information (S2140).

In addition, the UE transmits, to the eNB, data to which precoding (e.g., small delay CDD) described above is applied based on the information received from the eNB, and an RS (e.g., DMRS) for data decoding (S2150).

FIG. 22 is a flowchart showing another operation method of a UE to which a method proposed in the present disclosure may be applied.

That is, FIG. 22 relates to a method for transmitting an uplink signal by a user equipment (UE) in a wireless communication system.

First, the UE receives, from the eNB, first control information related to a delay value applied to precoding for a small-delay cyclic delay diversity (CDD) (S2210).

Step S2210 above may be configured to include (i) receiving, from the eNB, information on a range of the first control information through higher layer signaling and receiving, from the eNB, downlink control information (DCI) indicating a specific value within the range of the first control information. More specific contents related thereto will be described with reference to the first embodiment.

The delay value may be configured based on the number of antenna ports, and a bandwidth or a bandwidth part (BWP) configured for transmission of the uplink signal.

The number of antenna ports may be 2 or 4, and the first control information may have any one value of 0, 1, 2, or 3.

The delay value may be configured for each antenna port and/or for each antenna port group.

The higher layer signaling may be RRC signaling or MAC CE.

In addition, the UE performs a signal processing process in a physical layer in S2220 and S2230. More specific contents of the signal processing process in the physical layer will be described with reference to FIG. 25 and a related description.

The UE layer maps a complex-valued modulation symbol to one or more transmission layers (S2220).

In addition, the UE perform precoding based on a precoding matrix and a diagonal matrix in order to transmit the complex-valued modulation symbol on each transmission layer on the antenna port (S2230).

Here, the diagonal matrix is determined based on the delay value.

More specifically, the delay value is determined based on the first control information and second control information determined by a size of a configured band.

Here, the delay value is determined as the first control information/second control information.

The second control information is a smallest number of a set of {128,256,512,1024,2048} to be greater than or equal to a product of $N_{RB}$ and $N_{sc}^{RB}$.

The $N_{RB}$ is a number of resource block (RB) of the configured band, and $N_{sc}^{RB}$ is a number of subcarrier within the RB.

Thereafter, the UE transmits, to the eNB, the uplink signal based on the symbol processed based on step S2230 (S2240). The uplink signal may be transmitted on a PUSCH or PUCCH.

Next, a process in which the operation method of the UE performed in FIG. 22 is implemented in the UE will be described.

A user equipment (UE) for transmitting the uplink signal in the wireless communication system may include a transceiver for transceiving a radio signal, and a processor connected to the transceiver.

The processor may control to receive, from the eNB, first control information related to a delay value applied to precoding for a small-delay cyclic delay diversity (CDD), layer map a complex-valued modulation symbol to one or more transmission layers, perform the precoding based on a precoding matrix and a diagonal matrix in order to transmit the complex-valued modulation symbol on each transmission layer on the antenna port, and transmit the uplink signal to the eNB.

Here, the diagonal matrix may be determined based on the delay value.

More specifically, the delay value is determined based on the first control information and second control information determined by a size of a configured band.

Here, the delay value is determined as the first control information/second control information.

The second control information is a smallest number of a set of $N_{RB}$ to be greater than or equal to a product of $N_{sc}^{RB}$ {128,256,512, and 1024,2048}. The $N_{RB}$ is a number of resource block (RB) of the configured band, and $N_{sc}^{RB}$ e is a number of subcarrier within the RB. Here, the processor may control to receive, from the eNB, the first control information by (i) receiving information on a range first control information which a value of the first control information may have through higher layer signaling and (ii) receiving downlink control information (DCI) indicating a specific value within the range of the first control information.

The delay value may be configured based on the number of antenna ports, and a bandwidth or a bandwidth part (BWP) configured for transmission of the uplink signal.

The delay value may be configured for each antenna port and/or for each antenna port group.

The higher layer signaling may be RRC signaling or MAC CE.

The number of antenna ports may be 2 or 4, and the first control information may have any one value of 0, 1, 2, or 3.

A process in which the method proposed in the present disclosure is implemented in a processor included in a specific device will be described.

The specific device may include one or more memories and one or more processors functionally connected to the one or more memories.

Here, the specific device may be the device mentioned in the present disclosure or a device described in FIGS. 23 to 27 to be described below.

The one or more processors may control the specific device to receive, from the eNB, first control information related to a delay value applied to precoding for a small-delay cyclic delay diversity (CDD), layer map a complex-valued modulation symbol to one or more transmission layers, perform the precoding based on a precoding matrix and a diagonal matrix in order to transmit the complex-valued modulation symbol on each transmission layer on the antenna port, and transmit the uplink signal to the eNB.

Here, the diagonal matrix may be determined based on the delay value.

More specifically, the delay value is determined based on the first control information and second control information determined by a size of a configured band.

Here, the delay value is determined as the first control information/second control information.

The second control information is a smallest number of a set of $N_{RB}$ to be greater than or equal to a product of $N_{sc}^{RB}$ and {128,256,512,1024,2048}. The $N_{RB}$ is a number of resource block (RB) of the configured band, and $N_{sc}^{RB}$ is a number of subcarrier within the RB.

A process in which the method proposed in the present disclosure is implemented by firmware or software will be described.

One or more non-transitory computer-readable media may store one or more instructions in order to transmit an uplink signal in a wireless communication system. The one or more instructions executable by one or more processors may receive, from the eNB, first control information related to a delay value applied to precoding for a small-delay cyclic delay diversity (CDD), layer map a complex-valued modulation symbol to one or more transmission layers, perform the precoding based on a precoding matrix and a diagonal matrix in order to transmit the complex-valued modulation symbol on each transmission layer on the antenna port, and transmit the uplink signal to the eNB.

Here, the diagonal matrix may be determined based on the delay value.

More specifically, the delay value is determined based on the first control information and second control information determined by a size of a configured band.

Here, the delay value is determined as the first control information/second control information.

The second control information is a smallest number of a set of $N_{RB}$ to be greater than or equal to a product of $N_{sc}^{RB}$ and {128,256,512,1024,2048}. The $N_{RB}$ is a number of resource block (RB) of the configured band, and $N_{sc}^{RB}$ is a number of subcarrier within the RB.

As described above, all of respective steps of the operation flowcharts of the eNB and the UE are not required, and some of the respective steps may be omitted.

Moreover, the indicating of the uplink scheduling information and the SRI/TPMI/TRI/MCS information to the UE and the receiving of the uplink scheduling information and the SRI/TPMI/TRI/MCS information from the eNB may be operations of transmitting/receiving the DCI described above.

In relation to the present disclosure, the operations of the eNB and/or the UE may be implemented by devices to be described below. For example, the eNB may correspond to a transmitting device and the UE may correspond to a receiving device, and an opposite case thereto may also be considered. As a specific example, the UE may receive the DCI through an RF unit and perform DCI decoding and blind decoding (BD) of a DMRS port through a processor and then perform decoding for data. In this process, the UE may use a memory and store the decoded data in the memory. Further, the eNB may store data to be transmitted in the memory, and perform scheduling for data signal transmission and DCI encoding by using the processor. Thereafter, the eNB may transmit the DCI through the RF unit.

Further, in the methods and embodiments, the UE and/or the eNB which operate according to each of the steps of FIGS. 20 to 22 may be specifically implemented by devices of FIGS. 23 to 27 to be described below. For example, the eNB may correspond to a first wireless device and the UE may correspond to a second wireless device and in some cases, an opposite thereto may also be considered.

For example, the eNB/UE signaling and operation (e.g., FIGS. 20 to 22) may be processed by one or more processors (e.g., 102 and 202) of FIGS. 24 to 27 and the eNB/UE signaling and operation (e.g., FIGS. 27 to 30) may be stored in a memory (e.g., one or more memories (e.g., 104 and 204) of FIGS. 24 to 27) in the form of a command/program (e.g., instruction and executable code) for driving at least one processor (e.g., 102 and 202) of FIGS. 31 to 35.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 23 illustrates a communication system applied to the present disclosure.

Referring to FIG. 23, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device to which Present Disclosure is Applied

FIG. 24 illustrates a wireless device which may be applied to the present disclosure.

FIG. 24 is a block diagram illustrating components of a transmitting device 10 and a receiving device 20 performing the present disclosure. Here, each of the transmitting device and the receiving device may be an eNB or a UE.

The transmitting device 10 and the receiving device 20 may include tranceivers 13 and 23 capable of transmitting or receiving a radio signal for carrying information and/or data, a signal, a message, etc., memories 12 and 22 storing various information related to communication in a wireless communication system, and processors 11 and 21 configured to be connected to components such as the transceivers 13 and 23 and the memories 12 and 22, and control the components and control the memories 12 and 22 and/or the transceiver 13 and 23 to control the corresponding device to perform at least one of the embodiments of the present disclosure, respectively.

The memories 12 and 22 may store programs for processing and controlling of the processors 11 and 21, and temporarily store inputted/outputted information. The memories 12 and 22 may be used as buffers.

The processors 11 and 21 generally control overall operations of various modules in the transmitting device or the receiving device. In particular, the processors 11 and 21 may perform various control functions for performing the present disclosure. The processors 11 and 21 may also be referred to as a controller, a microcontroller, a microprocessor, a microcomputer, or the like. The processors 11 and 21 may be implemented by hardware or firmware, software, or a combination thereof. When the present disclosure is implemented by using the hardware, the processors 11 and 21 may include application specific integrated circuits (ASICs) or digital signal processors (DSPs), digital signal processing devices (DSPDs), programmable logic devices (PLDs), field programmable gate arrays (FPGAs), etc., configured to perform the present disclosure. Meanwhile, when the present disclosure is implemented using firmware or software, the firmware or software may be configured to include the modules, procedures, or functions performing the functions or operations of the present disclosure, and the firmware or software configured perform the present disclosure is provided in the processors 11 and 21 or stored in the memories 12 and 22 so as to be driven by the processors 11 and 21.

The processor 11 of the transmitting device 10 may perform predetermined coding and modulation for signals and/or data to be transmitted to the outside and then transmit the coded and modulated signals and data to the transceiver 13. For example, the processor 11 may generate codewords by performing demultiplexing and channel coding, scrambling, a modulation process, for a data stream to be transmitted. The codewords may include information equivalent to a transport block which is a data block provided by the MAC layer. One transport block (TB) may be coded with one codeword. Each codeword may be transmitted to the receiving device through one or more layers. The transceiver 13 may include an oscillator for frequency up-convert. The transceiver 13 may include one or a plurality of transmit antennas.

A signal processing process of the receiving device 20 may be configured reversely to the signal processing process of the transmitting device 10. Under the control of the processor 21, the transceiver 23 of the receiving device 20 may receive the radio signal transmitted by the transmitting device 10. The transceiver 23 may include one or a plurality of receive antennas. The transceiver 23 may frequency down-convert each signal received through the receive antenna and reconstruct the corresponding signal into a baseband signal. The transceiver 23 may include the oscillator for frequency down convert. The processor 21 may perform decoding and demodulation for the radio signal received through the receive antenna and reconstruct data which the transmitting device 10 intends to transmit originally.

The transceivers 13 and 23 may include one or a plurality of antennas. The antenna may serve to transmit the signals processed by the transceivers 13 and 23 to the outside or receive the radio signals from the outside, and transfer the received radio signals to the transceivers 13 and 23, according to an embodiment of the present disclosure under the control of the processors 11 and 21. The antenna may also be referred to as an antenna port. Each antenna may correspond to one physical antenna or may be configured by a combination of one or more physical antenna elements. The signal transmitted from each antenna may not be resolved by the receiving device 20 any longer. A reference signal (RS) transmitted to corresponding to the antenna defines an antenna viewed in terms of the receiving device 20, and may enable the receiving device 20 to perform channel estimation for the antenna regardless of whether a channel is a single radio channel from one physical antenna or a composite channel from a plurality of physical antenna elements including the antenna. That is, the antenna may be defined in such a manner that a channel for transferring a symbol on the antenna may be derived from the channel through which another symbol on the antenna is transferred. A transceiver that supports a multi-input multi-output (MIMO) function of transmitting and receiving data by using a plurality of antennas may be connected two or more antennas.

In applying the scheme proposed by the present disclosure, if the device 10 is the UE, a single transmitting device 10 having a structure in which a single processor 11 controls a plurality of transceivers 13 or a single transmitting device 10 constituted by a transceiver 13 constituted by a plurality of antennas may transmit a signal to a single receiving device 20, and a transport panel may be constituted in units of each transceiver or an antenna (group) in the transceiver. When a plurality of antennas is mounted on each transport panel, input signals into elements (e.g., phase shifter and power amplifier) for controlling a phase (and a magnitude) of a signal transmitted in each antenna may be configured in order to a transmission beam in each panel, and a separate processor for controlling input values (e.g., phase shift values) for the elements may be mounted or the single processor may be configured in a structure to input a control signal for input values for the elements. In this case, a transceiver structure of the device 10, a transmitting device structure and a receiving device structure may be configured to correspond to each other. That is, one transport panel may correspond to one receive panel, and in this case, the antenna of each panel may serve as both the transmit antenna and the receive antenna.

Example of Signal Processing Circuit to which Present Disclosure is Applied

FIG. 25 illustrates a signal processing circuit for a transmit signal.

FIG. 25 illustrates an example of a signal processing module structure in the transmitting device 10. Here, signal processing may be performed by the processor of the base station/UE, such as the processor 11 of FIG. 24.

Referring to FIG. 25, the transmitting device 10 in the UE or the eNB may include a scrambler 301, a modulator 302, a layer mapper 303, an antenna port mapper 304, a resource block mapper 305, and a signal generator 306.

The transmitting device 10 may transmit one or more codewords. Each of coded bits in each codeword is scrambled by the scrambler 301 and transmitted on a physical channel. The codeword may be referred to as the data stream, and may be equal to the transport block which is the data block provided by the MAC layer.

The scrambled bits are modulated into complex-valued modulation symbols by the modulator 302. The modulator 302 may modulate the scrambled bits according to a modulation scheme and arrange the modulated bits as a complex-valued modulation symbols for expressing a position on a signal constellation. There is no limit in modulation scheme, and m-Phase Shift Keying (m-PSK) or m-Quadrature Amplitude Modulation (m-QAM) may be used for modulating the coded data. The modulator may be referred to as a modulation mapper.

The complex-valued modulation symbol may be mapped to one or more transport layers by the layer mapper 303. The complex-valued modulation symbol on each layer may be mapped by the antenna port mapper 304 for transmission on the antenna port.

The resource block mapper 305 may be mapped to an appropriate resource element in a virtual resource block allocated for transmitting the complex-valued modulation symbol for each antenna port. The resource block mapper may map the virtual resource block to a physical resource block according to an appropriate mapping scheme. The resource block mapper 305 may allocate the complex-valued modulation symbol for each antenna port to an appropriate subcarrier, and multiplex the allocated complex-valued modulation symbol according to the user.

The signal generator 306 modulates the complex-valued modulation symbol for the each antenna port, i.e., an antenna specific symbol by a specific modulation scheme, e.g., the OFDM scheme to generate a complex-valued time domain Orthogonal Frequency Division Multiplexing (OFDM) symbol signal. The signal generator may perform Inverse Fast Fourier Transform (IFFT) for the antenna specific symbol, and a cyclic prefix (CP) may be inserted into a time domain symbol of which IFFT is performed. The OFDM symbol is transmitted by the receiving device through each transmit antenna via digital-to-analog conversion, frequency up convert, etc. The signal generator may include an IFFT module, a CP inserter, a Digital-to-Analog Converter (DAC), a frequency uplink converter, and the like.

FIG. 26 illustrates another example of a signal processing module structure in the transmitting device 10. Here, signal processing may be performed by the processor of the UE/base station, such as the processor 11 of FIG. 24.

Referring to FIG. 26, the transmitting device 10 in the UE or the eNB may include a scrambler 401, a modulator 402, a layer mapper 403, a precoder 404, a resource block mapper 405, and a signal generator 406.

The transmitting device 10 may scramble coded bits in one codeword by the scrambler 401 and then transmit the scrambled bits through the physical channel.

The scrambled bits are modulated into the complex-valued modulation symbol by the modulator 402. The modulator may modulate the scrambled bits according to a predetermined modulation scheme and arrange the modulated bits as the complex-valued modulation symbols for expressing the position on the signal constellation. There is no limit in modulation scheme, and pi/2-Binary Phase Shift Keying (pi/2-BPSK), m-Phase Shift Keying (m-PSK) or m-Quadrature Amplitude Modulation (m-QAM) may be used for modulating the coded data.

The complex-valued modulation symbol may be mapped to one or more transport layers by the layer mapper 403.

The complex-valued modulation symbol on each layer may be mapped by the precoder 404 for transmission on the antenna port. Here, the precoder 1040 may perform transform precoding for the complex-valued modulation symbol and perform precoding for the complex-valued modulated symbol. Alternatively, the precoder may perform the precoding without performing the transform precoding. The precoder 404 may output the antenna specific symbols by processing the complex-valued modulation symbol by the MIMO scheme according to the multiple transmit antennas, and distribute the antenna specific symbols to the corresponding resource block mapper 405. An output z of the precoder 404 may be obtained by multiplying an output y of the layer mapper 403 by a precoding matrix W of N*M. Here, N represents the number of antenna ports and M represents the number of transport layers.

The resource block mapper 405 may be mapped to an appropriate resource element in a virtual resource block allocated for transmitting the complex-valued modulation symbol for each antenna port.

The resource block mapper 405 may allocate the complex-valued modulation symbol to an appropriate subcarrier, and multiplex the allocated complex-valued modulation symbol according to the user.

The signal generator 406 modulates the complex-valued modulation symbol by a specific modulation scheme, e.g., the OFDM scheme to generate a complex-valued time domain Orthogonal Frequency Division Multiplexing (OFDM) symbol signal. The signal generator 406 may perform Inverse Fast Fourier Transform (IFFT) for the antenna specific symbol, and a cyclic prefix (CP) may be inserted into a time domain symbol of which IFFT is performed. The OFDM symbol is transmitted to the receiving device through each transmit antenna via digital-to-analog conversion, frequency up convert, etc. The signal generator 406 may include an IFFT module, a CP inserter, a Digital-to-Analog Converter (DAC), a frequency uplink converter, and the like.

A signal processing process of the receiving device 20 may be configured reversely to the signal processing process of the transmitting device. Specifically, the processor 21 of the transmitting device 10 performs decoding and demodulation for radio signals received through an antenna port(s) of the transceiver 23 from the outside. The receiving device 20 may include a plurality of receive antennas, and each signal received through the receive antenna is reconstructed to the baseband signal and then subjected to multiplexing and MIMO demodulation, and reconstructed to a data stream which the transmitting device 10 intends to transmit originally. The receiving device 20 may include a signal reconstructer for reconstructing the received signal into the baseband signal, a multiplexer for multiplexing received and processed signals, and a channel demodulator for demodulating a multiplexed signal stream into a corresponding codeword. The signal reconstructer, the multiplexer, and the channel demodulator may be configured as one integrated module performing the functions thereof or each independent module. More specifically, the signal reconstructer an analog-to-digital converter (ADC) converting an analog signal into a digital signal, a CP remover removing a PC from the digital signal, an FFT module outputting a frequency domain symbol by applying a fast Fourier transform (FFT) from which the CP is removed, and a resource element demppaer/equalizer reconstructing the frequency domain symbol to an antenna specific symbol. The antenna specific symbol is reconstructed into a transport layer by the multiplexer and the transport layer is reconstructed into a codeword which the transmitting device intends to transmit by the channel demodulator.

Example of Wireless Communication Device to which Present Disclosure is Applied

FIG. 27 illustrates an example of a wireless communication device according to an implementation example of the present disclosure.

According to FIG. 27, the wireless communication device, e.g., the UE may include at least one of a processor 2310 such as a digital signal processor (DSP) or a microprocessor, a transceiver 2335, a power management module 2305, an antenna 2340, a battery 2355, a display 2315, a keypad 2320 a global positioning system (GPS), a chip 2360, a sensor 2365, a memory 2330, a subscriber identification module (SIM) card 2325, a speaker 2345, and a microphone 2350. There may be a plurality of antennas and processors.

The processor 2310 may implement functions, procedures, and/or methods described in the present disclosure. The processor 2310 of FIG. 27 may be the processors 11 and 21 of FIG. 24.

The memory 2330 is connected to the processor 2310 and stores information related with an operation of the processor. The memory may be located inside or outside the processor, and may be connected to the processor through various technologies such as wired connection or wireless connection. The memory 2330 of FIG. 27 may be the memories 12 and 22 of FIG. 24.

The user may input various types of information such as a phone number by using various technologies such as pressing a button of the keypad 2320 or activating sound by using the microphone 2320. The processor 2310 may perform an appropriate function such as receiving and processing information on the user, making a call to the input phone number, etc. In some scenarios, data may be searched from the SIM card 2325 or the memory 2330 in order to perform an appropriate function. In some scenarios, the processor 2310 may display various types of information and data on the display 2315 for convenience of the user.

The transceiver 2335 is connected to the processor 2310 to transmit and/or receive a radio signal such as a radio frequency (RF) signal. The processor may control the transceiver to initiate communication or transmit a radio signal including various types of information or data such as voice communication data, etc. The transceiver includes a transmitter and a receiver in order to transmit and receive the radio signal. The antenna 2340 may facilitate transmission and reception of the radio signal. In some implementation examples, when the transceiver receives the radio signal, the transceiver may forward and convert the signal to a baseband frequency for processing by the processor. The processed signal may be processed signal by various technologies such as converting into audible or readable information so as to be outputted through the speaker 2345. The transceiver of FIG. 27 may be the transceivers 13 and 23 of FIG. 24.

Although not illustrated in FIG. 27, various components including a camera, a universal serial bus (USB), a port, etc., may be additionally included in the UE. For example, the camera may be connected to the processor 2310.

FIG. 27 illustrates only one implementation example for the UE, and the implementation example is not limited thereto. The UE need not particularly include all components of FIG. 27. That is, some components, e.g., the keypad 2320, the Global Positioning System (GPS) chip 2360, the sensor 2365, the SIM card 2325, etc., may not be required elements, and in this case, the corresponding components may not be included in the UE.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

In the present disclosure, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. The base station may be replaced with terms such as a fixed station, Node B, eNode B (eNB), an access point, etc.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

Meanwhile, in the present disclosure, an embodiment of the present disclosure is described by using an LTE system, an LTE-A system, an NR system, but this is an example and the embodiment of the present disclosure may be applied even to any communication system corresponding to the definition.

Further, in the present disclosure, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. The base station may be replaced with terms such as fixed station, Node B, eNode B (eNB), access point, etc., and a name of the base station may be used as a comprehensive term including remote radio head (RRH), eNB, transmission point (TP), reception point (RP), a relay, etc. It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method for transmitting and receiving data in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method performed by a user equipment (UE) for transmitting an uplink signal in a wireless communication system, the method comprising:
receiving, from a base station, first control information related to a delay value which is applied to precoding for small-delay cyclic delay diversity (CDD);
performing layer mapping complex-valued modulation symbol to at least one transmission layer;
performing the precoding, based on a precoding matrix and a diagonal matrix, for transmitting complex-valued modulation symbol on each transmission layer on an antenna port; and
transmitting, to the base station, the uplink signal,
wherein the diagonal matrix is determined based on the delay value, and wherein the delay value is determined based on the first control information and second control information which is determined based on a size of a configured band.

2. The method of claim 1,
wherein the delay value is determined as the first control information/the second control information.

3. The method of claim 2,
wherein the second control information is a smallest number of a set of {128,256,512,1024,2048} to be greater than or equal to a product of $N_{RB}$ and $N_{sc}^{RB}$,
wherein the $N_{RB}$ is a number of resource block (RB) of the configured band, and
wherein $N_{sc}^{RB}$ is a number of subcarriers within the RB.

4. The method of claim 1,
wherein the configured band is a configured bandwidth (BW) or bandwidth part(BWP).

5. The method of claim 1, wherein receiving the first control information comprises:
receiving, from the base station, information on a range of the first control information through higher layer signaling; and
receiving, from the base station, downlink control information (DCI) representing a specific value within the range of the first control information.

6. The method of claim 1,
wherein the delay value is configured based on a number of the antenna port and bandwidth configured for transmitting the uplink signal or configured bandwidth part (BWP).

7. The method of claim 1,
wherein the delay value is configured for each of the antenna port and/or each antenna port group.

8. The method of claim 5,
wherein the higher layer signaling is Radio Resource Control (RRC) signaling or Medium Access Control-Control Element (MAC CE).

9. The method of claim 6,
wherein a number of the antenna port is 2 or 4.

10. The method of claim 1,
wherein the first control information is any one value of 0, 1, 2 or 3.

11. A user equipment (UE) for transmitting an uplink signal in wireless communication system, the UE comprising:
a transceiver for transceiving a radio signal; and
a processor connected to the transceiver,
wherein the processor is configured to:
receive, from a base station, first control information related to a delay value which is applied to precoding for small-delay cyclic delay diversity (CDD);
perform layer mapping complex-valued modulation symbol to at least one transmission layer;
perform the precoding, based on a precoding matrix and a diagonal matrix, for transmitting complex-valued modulation symbol on each transmission layer on an antenna port; and
transmit, to the base station, the uplink signal,
wherein the diagonal matrix is determined based on the delay value, and
wherein the delay value is determined based on the first control information and second control information which is determined based a size of a configured band.

12. The UE of claim 11,
wherein the delay value is determined as the first control information/the second control information.

13. The UE of claim 12,
wherein the second control information is a smallest number of a set of {128,256,512,1024,2048} to be greater than or equal to a product of $N_{RB}$ and $N_{sc}^{RB}$,
wherein the $N_{RB}$ is a number of resource block (RB) of the configured band, and
wherein $N_{sc}^{RB}$ is a number of subcarriers within the RB.

14. An apparatus comprising one or more memories and one or more processors operatively coupled to the one or more memories, the apparatus comprising:
wherein the one or more processors control the apparatus to:
receive, from a base station, first control information related to a delay value which is applied to precoding for small-delay cyclic delay diversity (CDD);
perform layer mapping complex-valued modulation symbol to at least one transmission layer;
perform the precoding, based on a precoding matrix and a diagonal matrix, for transmitting complex-valued modulation symbol on each transmission layer on an antenna port; and
transmit, to the base station, an uplink signal,
wherein the diagonal matrix is determined based on the delay value, and
wherein the delay value is determined based on the first control information and second control information which is determined based on a size of a configured band.

15. One or more non-transitory computer-readable media (CRM) storing one or more instructions, the one or more instructions comprising:
receiving, from a base station, first control information related to a delay value which is applied to precoding for small-delay cyclic delay diversity (CDD);
performing layer mapping complex-valued modulation symbol to at least one transmission layer;
perform the precoding, based on a precoding matrix and a diagonal matrix, for transmitting complex-valued modulation symbol on each transmission layer on an antenna port; and
transmitting, to the base station, an uplink signal,
wherein the diagonal matrix is determined based on the delay value, and
wherein the delay value is determined based on the first control information and second control information which is determined based on a size of a configured band.

* * * * *